US010724960B2

(12) United States Patent
Kurihara et al.

(10) Patent No.: US 10,724,960 B2
(45) Date of Patent: Jul. 28, 2020

(54) INSPECTION SYSTEM AND INSPECTION METHOD

(71) Applicants: The University of Tokyo, Tokyo (JP); RICOH ELEMEX CORPORATION, Aichi (JP)

(72) Inventors: Toru Kurihara, Kochi (JP); Shigeru Ando, Chiba (JP); Michihiko Yoshimura, Aichi (JP)

(73) Assignees: The University of Tokyo, Tokyo (JP); Ricoh Elemex Corporation, Aichi (JP); Kochi Prefectural Public University Corporation, Koichi (JP)

( * ) Notice: Subject to any disclaimer, the term of this patent is extended or adjusted under 35 U.S.C. 154(b) by 35 days.

(21) Appl. No.: 15/129,273

(22) PCT Filed: Mar. 31, 2015

(86) PCT No.: PCT/JP2015/060277
§ 371 (c)(1),
(2) Date: Sep. 26, 2016

(87) PCT Pub. No.: WO2015/152307
PCT Pub. Date: Oct. 8, 2015

(65) Prior Publication Data
US 2017/0115230 A1    Apr. 27, 2017

(30) Foreign Application Priority Data

Mar. 31, 2014    (JP) .................................. 2014-074880

(51) Int. Cl.
*G01N 21/88*    (2006.01)
(52) U.S. Cl.
CPC ..... *G01N 21/8806* (2013.01); *G01N 21/8851* (2013.01); *G01N 2021/8829* (2013.01);
(Continued)

(58) Field of Classification Search
CPC .......... G01N 21/8806; G01N 21/8851; G01N 2201/0625; G01N 2201/0634; G01N 21/88; G01B 11/2513; G01B 11/306
See application file for complete search history.

(56) References Cited

U.S. PATENT DOCUMENTS 8,089,636 B2 *    1/2012    Miyake ................ G01B 11/306
356/239.1
8,643,849 B2 *    2/2014    Tao .................... G01B 11/2513
356/5.01
(Continued)

FOREIGN PATENT DOCUMENTS

CN    101622525 A    1/2010
CN    102012376 A    4/2011
(Continued)

OTHER PUBLICATIONS

International Search Report issued in corresponding Applicaiton No. PCT/JP2015/060277, dated Jun. 30, 2015.
(Continued)

*Primary Examiner* — Violeta A Prieto
(74) *Attorney, Agent, or Firm* — McDermott Will & Emery LLP

(57) ABSTRACT

An inspection system of an embodiment includes: a planar illumination unit that temporally varies an intensity of light in a periodic manner by spatially moving a stripe pattern of the intensity of light; a time-correlation image generator that generates a time-correlation image with a time-correlation camera or an image capturing system that performs an operation equivalent to that of the time-correlation camera; and a calculation processor that calculates a characteristic from the time-correlation image, the characteristic corresponding to a distribution of normal vectors to an inspection target surface and serving to detect an abnormality based on
(Continued)

at least either a difference from a surrounding area or a difference from a reference surface.

12 Claims, 20 Drawing Sheets

(52) U.S. Cl.
CPC ............... *G01N 2201/0625* (2013.01); *G01N 2201/0634* (2013.01)

(56) References Cited

U.S. PATENT DOCUMENTS

| | | | |
|---|---|---|---|
| 2003/0156303 A1* | 8/2003 | Schnee | G06K 9/2009 358/509 |
| 2008/0006830 A1* | 1/2008 | Hsieh | H01J 61/305 257/79 |
| 2009/0226029 A1 | 9/2009 | Shimano et al. | |
| 2009/0315988 A1* | 12/2009 | Fukazawa | G01N 21/21 348/126 |
| 2011/0069320 A1* | 3/2011 | Miyake | G01B 11/2513 356/612 |
| 2012/0147383 A1* | 6/2012 | Tao | G01B 11/2513 356/601 |
| 2014/0103929 A1 | 4/2014 | Liu | |
| 2014/0192359 A1* | 7/2014 | Martini | G01N 21/05 356/417 |
| 2015/0211868 A1* | 7/2015 | Matsushita | G01C 21/32 701/457 |
| 2015/0211997 A1* | 7/2015 | Dake | G02B 21/0032 250/550 |
| 2017/0108443 A1* | 4/2017 | Kurihara | G01N 21/8806 |
| 2017/0115230 A1 | 4/2017 | Kurihara et al. | |

FOREIGN PATENT DOCUMENTS

| | | |
|---|---|---|
| CN | 102089616 A | 6/2011 |
| CN | 102169095 A | 8/2011 |
| CN | 103487441 A | 1/2014 |
| JP | 2000-127353 A | 5/2000 |
| JP | 2002-107309 A | 4/2002 |
| JP | 2002-148195 A | 5/2002 |
| JP | 2002-323454 A | 11/2002 |
| JP | 2005-030812 A | 2/2005 |
| JP | 2007-305061 A | 11/2007 |
| JP | 2011-085411 A | 4/2011 |
| JP | 2013-239934 A | 11/2013 |
| JP | 2014-002125 A | 1/2014 |
| JP | 2014-006133 A | 1/2014 |

OTHER PUBLICATIONS

Chinese Office Action issued in corresponding Chinese Patent Application No. 201580017619.6, dated May 24, 2018, with English Translation.

Japanese Office Action issued in corresponding Japanese Patent Application No. 2014-243561, dated Oct. 30, 2018, with English Translation.

Chinese Office Action issued in corresponding Chines Patent Application No. 201580017606.9, dated Jul. 25, 2018, with English Translation.

\* cited by examiner

ONE PERIOD

SCROLL → x-DIRECTION

FIG.15
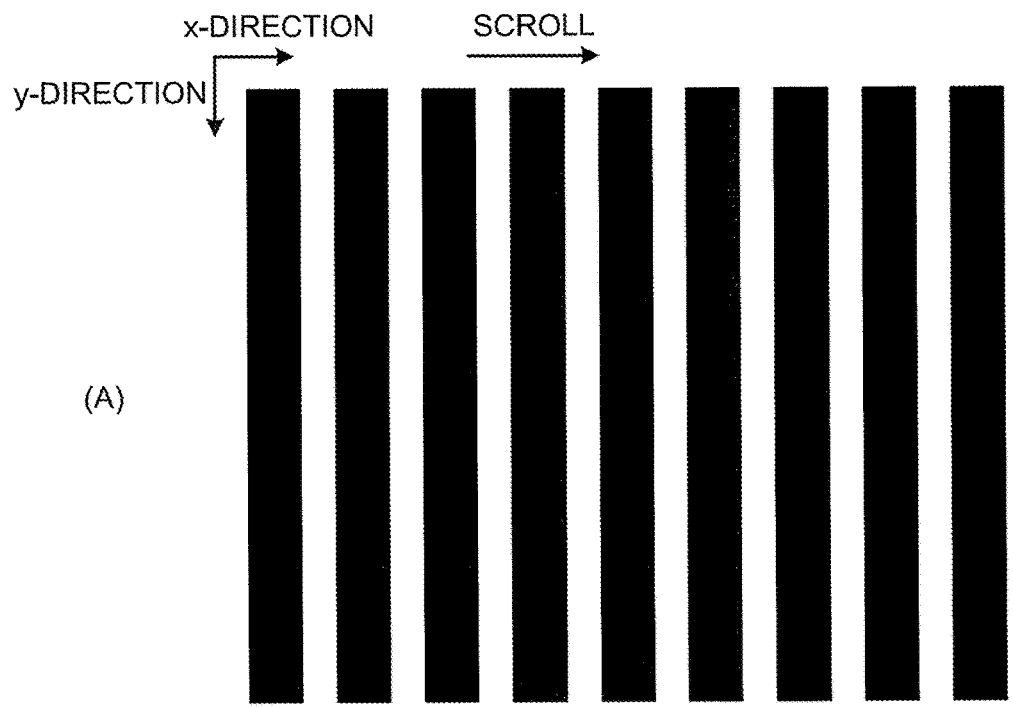
(A)
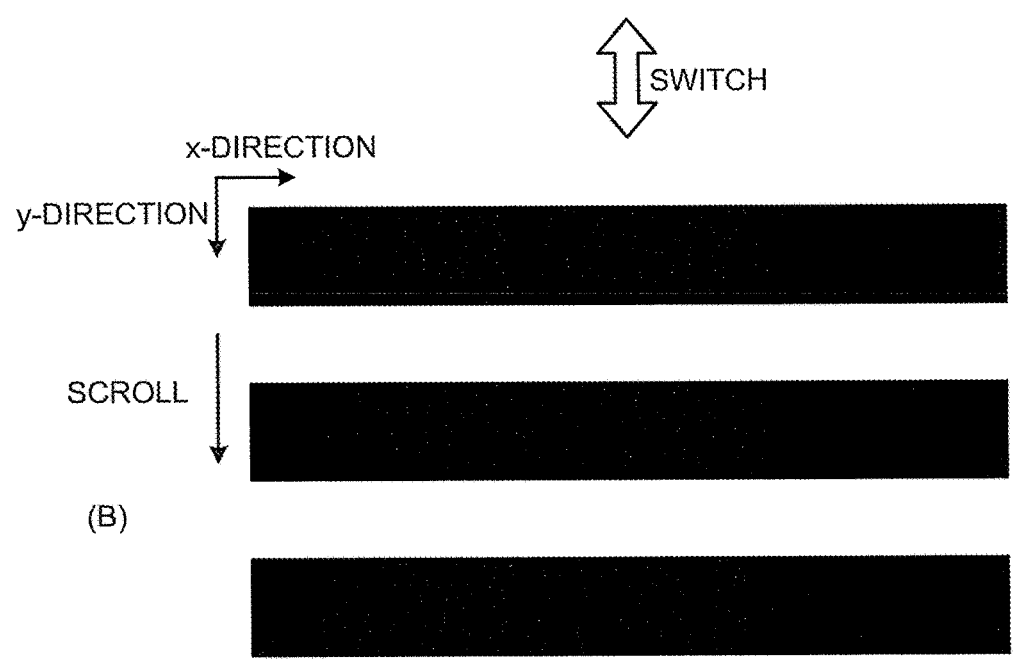
(B)

INSPECTION SYSTEM AND INSPECTION METHOD

CROSS-REFERENCE TO RELATED APPLICATIONS

This application is national stage application of International Application No. PCT/JP2015/060277, filed Mar. 31, 2015, which designates the United States, incorporated herein by reference, and which is based upon and claims the benefit of priority from Japanese Patent Application No. 2014-074880, filed Mar. 31, 2014, the entire contents of which are incorporated herein by reference.

FIELD

Embodiments of the present invention relate to an inspection system and an inspection method.

BACKGROUND

Conventionally, there have been developed techniques to irradiate an inspection subject with light, to capture the light reflected from a surface of the inspection subject as image data, and to detect abnormalities of the inspection subject based on a luminance variation of the image data.

In addition, there have been developed techniques to periodically vary the intensity of the light irradiating the inspection subject during the image caption and to detect the abnormalities based on the luminance variation of the captured image data.

SUMMARY OF THE INVENTION

Problem to be Solved by the Invention

However, in the conventional techniques, although the intensity of the light is varied, the captured image data does not include information on transition of time when the intensity of the light is varied. This may lower detection accuracy during the detection of the abnormalities of the inspection subject using the captured image data.

Means for Solving Problem

An inspection system of an embodiment comprises: a planar illumination unit that temporally varies an intensity of light in a periodic manner by spatially moving a stripe pattern of the intensity of light; a time-correlation image generator that generates a time-correlation image with a time-correlation camera or an image capturing system that performs an operation equivalent to that of the time-correlation camera; and a calculation processor that calculates a characteristic from the time-correlation image, the characteristic corresponding to a distribution of normal vectors to an inspection target surface and serving to detect an abnormality based on at least either a difference from a surrounding area or a difference from a reference surface

BRIEF DESCRIPTION OF DRAWINGS

FIG. 15 is a diagram illustrating a switching example between stripe patterns output by the illumination controller according to a second modification.

DETAILED DESCRIPTION

<First Embodiment>

Figure 1:
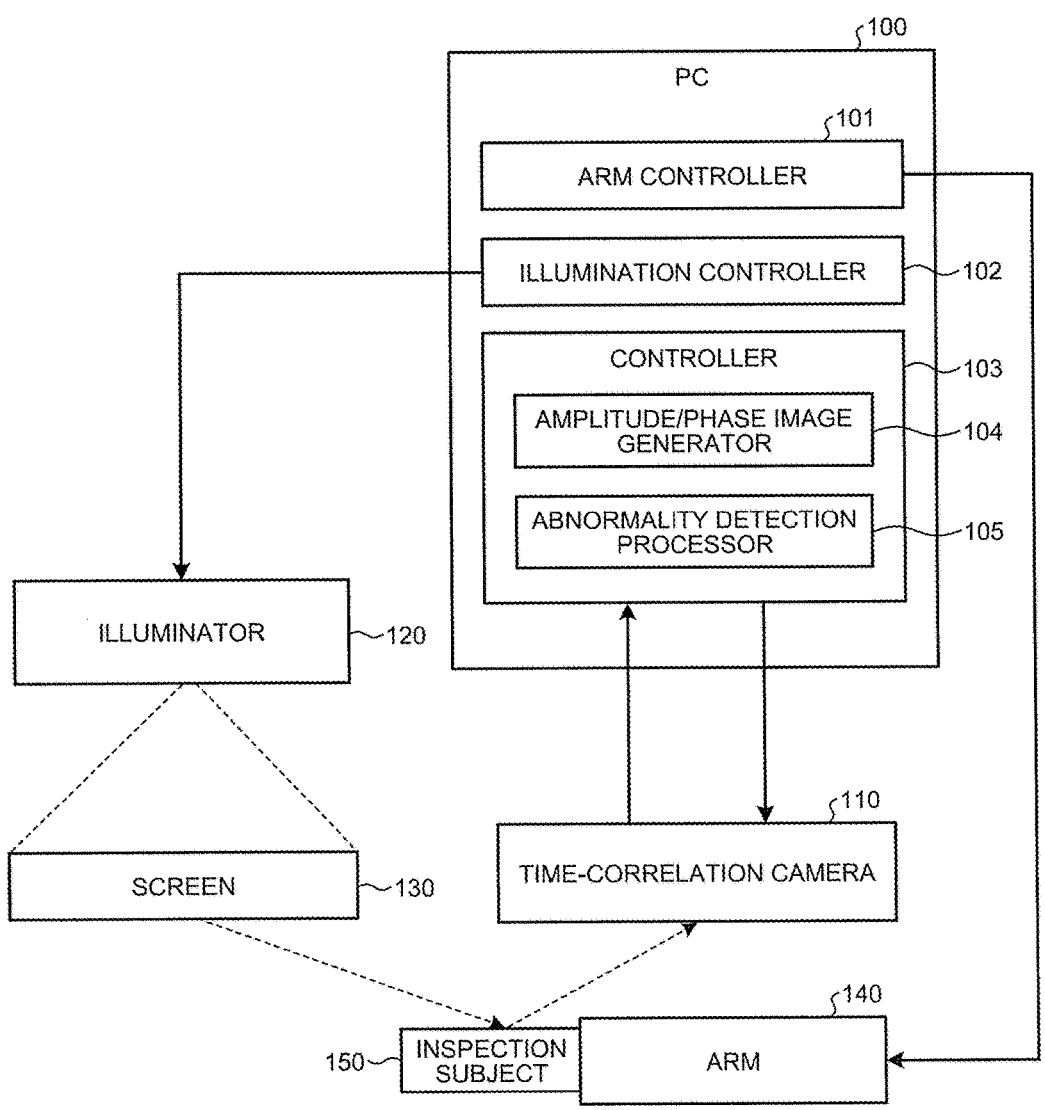
FIG. 1 is a diagram illustrating a configuration example of an inspection system according to a first embodiment.

An inspection system of the present embodiment will be described. The inspection system of the first embodiment includes various components for inspecting an inspection subject. FIG. 1 is a diagram illustrating a configuration example of the inspection system of the present embodiment. As illustrated in FIG. 1, the inspection system of the present embodiment includes: a personal computer (PC) 100; a time-correlation camera 110; an illuminator 120; a screen 130; and an arm 140.

The arm 140 is used to fix an inspection subject 150, and changes the position and the direction of a surface of the inspection subject 150 that can be captured by the time-correlation camera 110, according to control by the PC 100.

The illuminator 120 is a device for emitting light to the inspection subject 150, and is capable of controlling the intensity of the emitted light for each region according to a stripe pattern provided by the PC 100. In addition, the illuminator 120 can control the intensity of the emitted light for each region according to periodic transition of time. In other words, the illuminator 120 can temporally and spatially vary the intensity of the light in a periodic manner. A specific method for controlling the intensity of the light will be described later.

The screen 130 diffuses the light output from the illuminator 120, and then, emits the light in a planar manner to the inspection subject 150. The screen 130 of the present embodiment emits the light that is supplied from the illuminator 120 and is temporally and spatially varied in a periodic manner in a planar manner to the inspection subject 150. An optical component such as a light-collecting Fresnel lens (not illustrated) may be provided between the illuminator 120 and the screen 130.

In the present embodiment, as an example, it will be described that a planar light-emitting unit (illumination unit), which temporally and spatially varies the light intensity in a periodic manner, is configured with the combination of the illuminator 120 and the screen 130. However, the illumination unit is not limited to such combination. The illumination unit may be configured, for example, by arranging light-emitting diodes (LEDs) in a planar manner.

Figure 2:
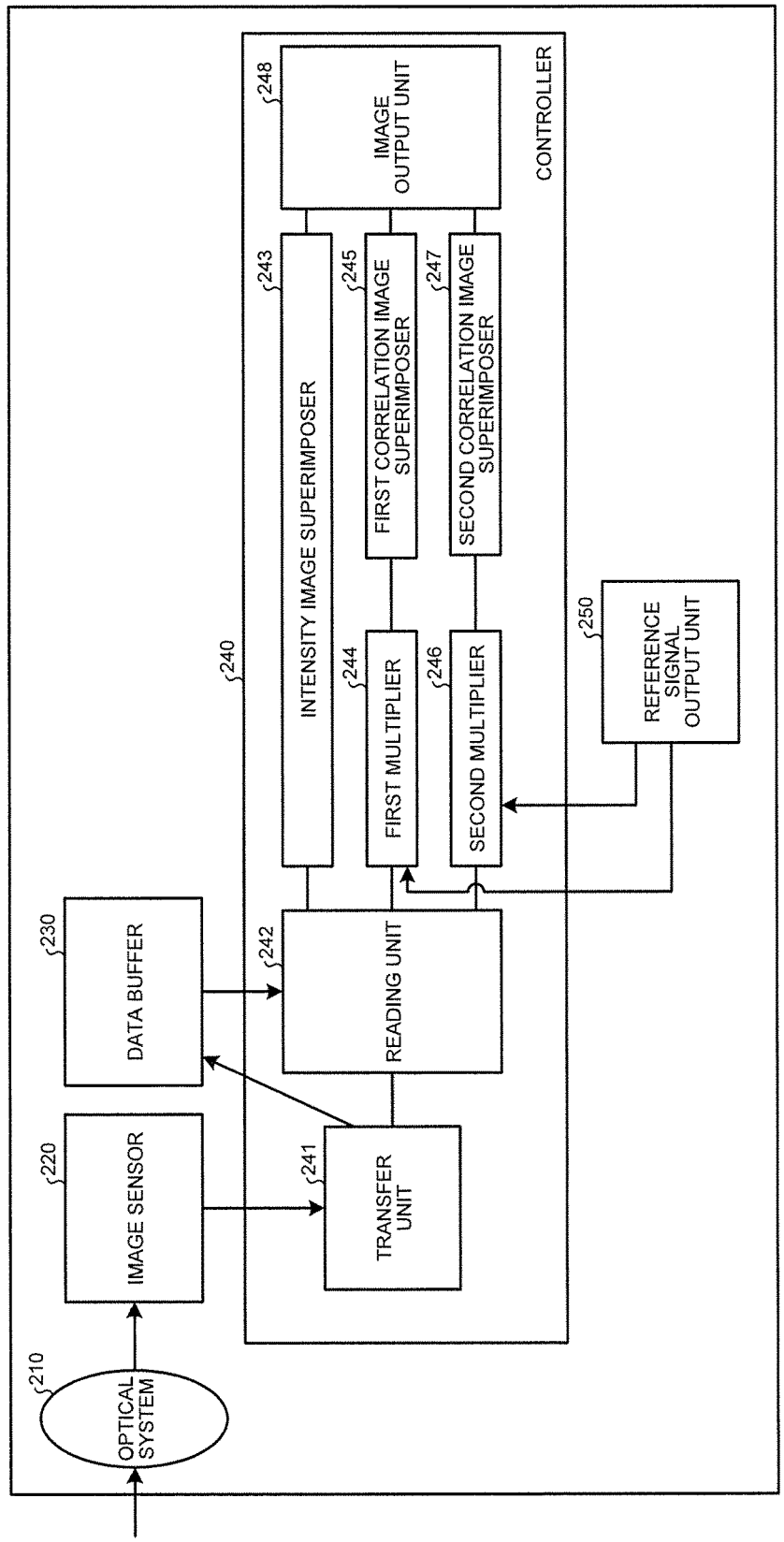
FIG. 2 is a block diagram illustrating a configuration of a time-correlation camera of the first embodiment.

The time-correlation camera 110 includes: an optical system 210; an image sensor 220; a data buffer 230; a controller 240; and a reference signal output unit 250. FIG. 2 is a block diagram illustrating the configuration of the time-correlation camera 110 of the present embodiment.

The optical system 210 includes, for example, a photographing lens, and transmits a light flux from a capturing target (including the inspection subject) outside the time-correlation camera 110 to provide an optical image of the capturing target formed by the transmitted light flux.

The image sensor 220 is a sensor capable of quickly outputting the intensity of the light incident through the optical system 210 as light intensity signals on a pixel-by-pixel basis.

The light intensity signals of the present embodiment are obtained by emitting the light from the illuminator 120 of the inspection system to the capturing target (including the inspection subject) and receiving the light reflected from the capturing target with the image sensor 220.

The image sensor 220 is, for example, a sensor capable of quicker reading than that of conventional sensors. The image sensor 220 is configured in a two-dimensional planar shape in which pixels are arranged in two types of directions, that is, the row direction (x-direction) and the column direction (y-direction). The pixels of the image sensor 220 are denoted as pixels $p(1,1), \ldots, P(i,j), \ldots, P(x,y)$ (where the image size is X×Y, in the present embodiment). The reading speed of the image sensor 220 is not limited. The reading speed of the image sensor 220 may be the same as the conventional speed.

The image sensor 220 receives and photoelectrically converts the light flux that has come from the capturing target (including the inspection subject) and has passed through the optical system 210. By this configuration, the image sensor 220 generates two-dimensional planar frames that are constituted by the light intensity signals (capturing signals) representing the intensity of the light reflected from the photographic subject. And then, the image sensor 200 outputs the generated frames to the controller 240. The image sensor 220 of the present embodiment outputs the frames at intervals of unit time at which the frames can be read.

The controller 240 of the present embodiment is configured with, for example, a central processing unit (CPU), a read-only memory (ROM), and a random access memory (RAM). The controller 240 executes an inspection program stored in the ROM to implement a transfer unit 241; a reading unit 242; an intensity image superimposer 243; a first multiplier 244; a first correlation image superimposer 245; a second multiplier 246; a second correlation image superimposer 247; and an image output unit 248. This configuration is not limited to being implemented by the CPU and the like, but may be implemented by a field-programmable gate array (FPGA) or an application-specific integrated circuit (ASIC).

The transfer unit 241 stores the frames constituted by the light intensity signals output from the image sensor 220 in chronological order in the data buffer 230.

The data buffer 230 stores therein the frames constituted by the light intensity signals output from the image sensor 220 in chronological order.

Figure 3:
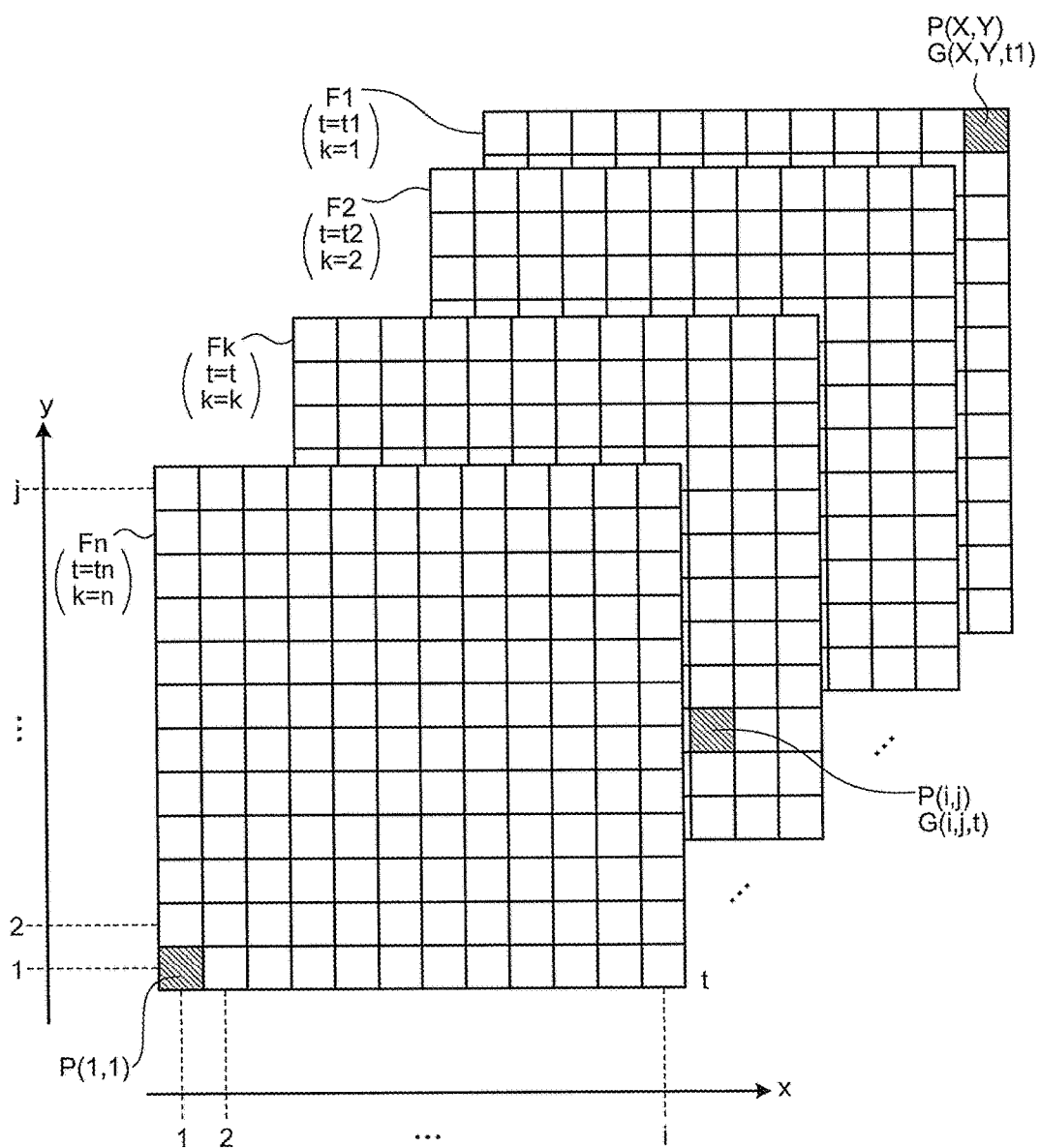
FIG. 3 is a conceptual diagram illustrating frames stored in chronological order in the time-correlation camera of the first embodiment.

FIG. 3 is a conceptual diagram illustrating the frames stored in chronological order in the time-correlation camera 110 of the present embodiment. As illustrated in FIG. 3, the data buffer 230 of the present embodiment stores therein a plurality of frames Fk (k=1, 2, . . . , n) in chronological order. The frames Fk (k=1, 2, . . . , n) are constituted by a combination of a plurality of light intensity signals G(1, 1,t), . . . , G(i,j,t), . . . , G(X,Y,t) at time t (t=t0, t1, t2, . . . , tn). Each of the frames created at the time t is constituted by the light intensity signals G(1,1,t), . . . , G(i,j,t), . . . , G(X,Y,t).

The light intensity signals (capturing signals) G(1, 1,t), . . . , G(i,j,t), . . . , G(X,Y,t) of the present embodiment respectively correspond to the pixels P(1,1), . . . , P(i,j), . . . , P(X,Y) constituting the frame images Fk (k=1, 2, . . . , n).

The frames output from the image sensor 220 are constituted by only the light intensity signals. In other words, the frames output from the image sensor 220 can be considered to be monochrome image data. In the present embodiment, as an example, it will be described that the image sensor 220 generates the monochrome image data considering resolution, sensitivity, cost, and the like. However, the image sensor 220 is not limited to the image sensor for monochrome imaging, but may be an image sensor for color imaging.

Referring back to FIG. 2, the reading unit 242 of the present embodiment reads out the light intensity signals G(1,1,t), . . . , G(i,j,t), . . . , G(X,Y,t) in chronological order from the data buffer 230 on a frame-by-frame basis. And then, the reading unit 242 outputs the light intensity signals to the first multiplier 244, the second multiplier 246, and the intensity image superimposer 243.

The time-correlation camera 110 of the present embodiment generates image data for each of the output destinations of the reading unit 242. In other words, the time-correlation camera 110 creates three types of image data.

The time-correlation camera 110 of the present embodiment generates intensity image data and two types of time-correlation image data, as the three types of image data. The present embodiment is not limited to generating the three types of image data. Cases can be considered where the intensity image data is not generated, and where one type or three or more types of time-correlation image data is/are generated.

As described above, the image sensor 220 of the present embodiment outputs the frames constituted by the light intensity signals at intervals of unit time. However, generating the normal image data requires the light intensity signals corresponding to an exposure time necessary for capturing. To fulfill this requirement, in the present embodiment, the intensity image superimposer 243 generates the intensity image data by superimposing a plurality of frames corresponding to the exposure time necessary for capturing. Each pixel value (value representing the intensity of light) G(x,y) of the intensity image data can be derived from Expression (1) given below. The exposure time is defined as a time difference between t0 and tn.

$$G(x,y) = \int_{t0}^{tn} G(x,y,t) dt \quad (1)$$

Thus, in the same manner as in the case of capturing with a conventional camera, the intensity image data obtained by capturing the capturing subject (including the inspection subject) is generated. The intensity image superimposer 243 outputs the generated intensity image data to the image output unit 248.

The time-correlation image data is image data representing a variation in intensity of light with time transition. That is, in the present embodiment, for each of the frames in chronological order, the light intensity signals included in the frame are multiplied by a reference signal indicating the time transition. Then, a time-correlation value frame, which is constituted by time-correlation values that are multiplication results of the reference signal and the light intensity signals, is generated, and a plurality of such time-correlation value frames are superimposed. Thus, the time-correlation image data is generated.

Meanwhile, in order to detect abnormalities of the inspection subject with the time-correlation image data, it is necessary to vary the light intensity signals entering the image sensor 220 in synchronization with the reference signal. Therefore, in the above description, the illuminator 120 emits the light in a planar manner so as to cause the periodic temporal variation and the spatial movement of the stripes through the screen 130.

In the present embodiment, the two types of time-correlation image data are generated. The reference signal needs to be a signal indicating the time transition. In the present embodiment, a complex sinusoidal wave $e^{-j\omega t}$ is used as the reference signal. The symbol $\omega$ represents an angular frequency, and the symbol t represents time. The angular frequency $\omega$ is set so that the complex sinusoidal wave $e^{-j\omega t}$ representing the reference signal correlates with one period of the above-described exposure time (i.e., the time necessary for generating the intensity image data and the time-correlation image data). That is, the planar and dynamic light formed by an illuminator, such as the illuminator 120 and the screen 130, causes the irradiation intensity in each position of the surface (reflecting surface) of the inspection subject 150 to temporally vary at a first period (temporal period). In addition, the planar and dynamic light causes the irradiation intensity to be spatially distributed with a variation in level at a second period (spatial period) along at least one direction along the surface. This planar light is complex modulated according to specifications (such as a distribution of normal vectors) of the surface when being reflected by the surface. The time-correlation camera 110 receives the light that has been complex modulated by the surface and orthogonally detects (orthogonally demodulates) the received light with the reference signal at the first period, so that the time-correlation image data as complex signals is obtained. Such modulation and demodulation based on complex-time-correlation image data enable detection of a characteristic corresponding to the distribution of normal vectors to the surface.

The complex sinusoidal wave $e^{-j\omega t}$ can be expressed as $e^{-j\omega t}=\cos(\omega t)-j\cdot\sin(\omega t)$. Consequently, each pixel value C(x,y) of the time-correlation image data can be derived from Expression (2) given below.

$$C(x, y) = \int_{t0}^{tn} G(x, y, t) \cdot e^{-j\omega t} dt \quad (2)$$
$$= \int_{t0}^{tn} G(x, y, t) \cdot (\cos(\omega t) - j\sin(\omega t)) dt$$

In the present embodiment, Expression (2) is divided into a pixel value C1(x,y) representing a real part and a pixel value C2(x,y) representing an imaginary part to generate the two types of time-correlation image data.

For this reason, the reference signal output unit 250 generates different reference signals for the first multiplier 244 and the second multiplier 246, and outputs them to the respective multipliers 244 and 246. The reference signal output unit 250 of the present embodiment outputs a first reference signal $\cos\omega t$ corresponding to the real part of the complex sinusoidal wave $e^{-j\omega t}$ to the first multiplier 244, and outputs a second reference signal $\sin\omega t$ corresponding to the imaginary part of the complex sinusoidal wave $e^{-j\omega t}$ to the second multiplier 246. Herein, it is described that the reference signal output unit 250 outputs the two types of reference signals represented as time functions of a sine wave and a cosine wave configuring a Hilbert transform pair with each other, as an example. However, the reference signals may be reference signals, such as time functions, that vary with time transition.

The first multiplier 244 multiplies each of the light intensity signals in each of the frames supplied from the reading unit 242 by the real part cos ωt of the complex sinusoidal wave $e^{-j\omega t}$ supplied from the reference signal output unit 250, on a frame-by-frame basis.

The first correlation image superimposer 245 performs processing to superimpose the multiplication result of the first multiplier 244 on a pixel-by-pixel basis for a plurality of frames corresponding to the exposure time necessary for capturing. Thus, each pixel value C1(x,y) of first time-correlation image data is derived from Expression (3) below.

$$C1(x,y) = \int_{t0}^{m} (G(x,y,t) \cdot \cos \omega t) dt \qquad (3)$$

The second multiplier 246 multiplies the light intensity signals in the frames supplied from the reading unit 242 by the imaginary part sin ωt of the complex sinusoidal wave $e^{-j\omega t}$ supplied from the reference signal output unit 250.

The second correlation image superimposer 247 performs processing to superimpose the multiplication result of the second multiplier 246 on a pixel-by-pixel basis for a plurality of frames corresponding to the exposure time necessary for capturing. Thus, each pixel value C2(x,y) of second time-correlation image data is derived from Expression (4) below.

$$C2(x,y) = \int_{t0}^{m} (G(x,y,t) \cdot \sin \omega t) dt \qquad (4)$$

Performing the above-described processing enables generation of the two types of time-correlation image data, i.e., the time-correlation image data having two degrees of freedom.

The present embodiment does not limit the types of the reference signals. For example, the present embodiment creates the two types of time-correlation image data, that is, the real part and the imaginary part of the complex sinusoidal wave $e^{-j\omega t}$. However, the present embodiment may generate two types of image data based on the amplitude of light and the phase of light.

The time-correlation camera 110 of the present embodiment can create multiple series of time-correlation image data. Due to this, when light obtained by combining stripes having a plurality of kinds of widths is emitted, the two types of time-correlation image data constituted by the real part and the imaginary part as described above can be created for each width of stripe, for example. Therefore, the time-correlation camera 110 includes multiple series of combinations each consisting of two multipliers and two correlation image superimposers, and the reference signal output unit 250 can output the reference signals at the angular frequencies co suitable for the respective series.

The image output unit 248 outputs the two types of time-correlation image data and the intensity image data to the PC 100. This causes the PC 100 to detect abnormalities of the inspection subject with the two types of time-correlation image data and the intensity image data. For that purpose, the capturing subject needs to be irradiated with light.

Figure 4:
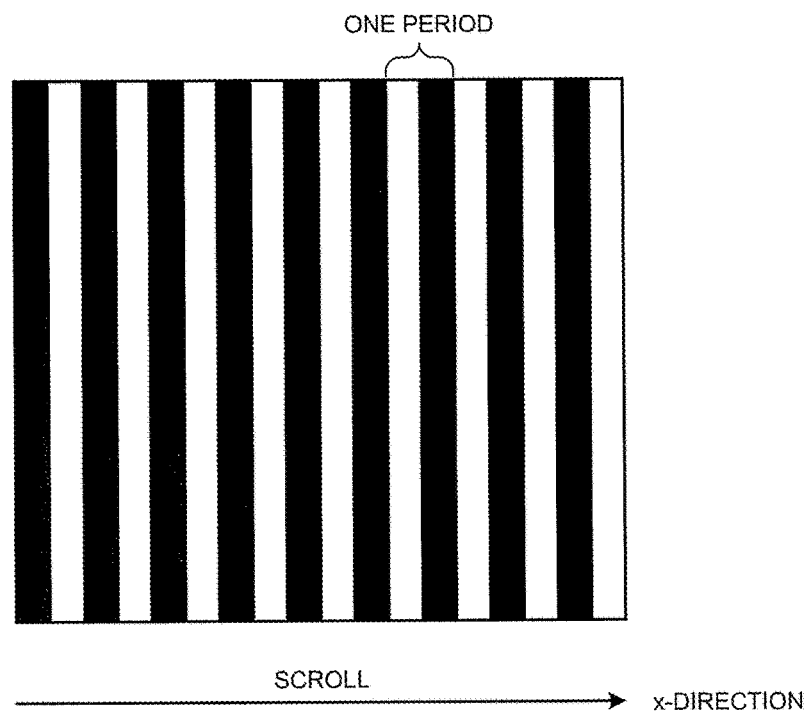
FIG. 4 is a diagram illustrating an example of a stripe pattern emitted by an illuminator of the first embodiment.

The illuminator 120 of the present embodiment emits the stripe pattern that moves quickly. FIG. 4 is a diagram illustrating an example of the stripe pattern emitted by the illuminator 120 of the present embodiment. In the example illustrated in FIG. 4 the stripe pattern is scrolled (moved) in the x-direction. White regions represent bright regions corresponding to the stripes, and black regions represent interval regions (dark regions) corresponding to spaces between the stripes.

In the present embodiment, the illuminator 120 moves the stripe pattern emitted therefrom by a distance corresponding to one period during the exposure time in which the time-correlation camera 110 captures the intensity image data and the time-correlation image data. Thus, the illuminator 120 temporally varies the intensity of the light in a periodic manner by spatially moving the stripe pattern of the intensity of the light. In the present embodiment, the time for movement by a distance corresponding to one period of the stripe pattern of FIG. 4 is caused to match the exposure time, so that information on the light intensity signals for at least one period of the stripe pattern is embedded in the respective pixels of the time-correlation image data.

In the present embodiment, it is described, as an example, that the illuminator 120 emits the stripe pattern based on a rectangular wave, as illustrated in FIG. 4. However, in the present embodiment, waves other than the rectangular wave may be used. In the present embodiment, the illuminator 120 emits the stripe pattern through the screen 130, so that the boundary regions between the dark and bright parts of the rectangular wave can be blurred.

In the present embodiment, the stripe pattern emitted by the illuminator 120 is represented as A(1+cos (ωt+kx)). That is, the stripe pattern includes a plurality of stripes in an iterative (a periodic) manner. The intensity of the light emitted to the inspection subject is adjustable between 0 A and 2 A, and the phase of the light is set to kx. The symbol k represents a wavenumber of the stripes. The symbol x represents a direction in which the phase varies.

The fundamental frequency component of a light intensity signal f(x,y,t) of each pixel of the frames can be represented as Expression (5) below. As represented by Expression (5), the brightness of the stripes varies in the x-direction.

$$f(x,y,t) = A(1+\cos(\omega t+kx)) = A + A/2 \{e^{j(\omega t+kx)} + e^{-j(\omega t+kx)}\} \qquad (5)$$

As represented by Expression (5), the intensity signal of the stripe pattern emitted by the illuminator 120 can be considered as a complex number.

The light from the illuminator 120 is reflected by the capturing subject (including the inspection subject), and the image sensor 220 receives the reflected light.

Accordingly, the light intensity signal G(x,y,t) to be received by the image sensor 220 can be equated to the light intensity signal f(x,y,t) of each pixel of the frames when the illuminator 120 emits the stripe pattern. Hence, Expression (6) can be derived by substituting Expression (5) into Expression (1) that is used to derive the intensity image data. The symbol kx represents the phase.

$$G(x, y) = \int_0^T f(x, y, t) dt = \int_0^T \left\{ A + \frac{A}{2}(e^{j(\omega t+kx)} + e^{-j(\omega t+kx)}) \right\} dt = AT \qquad (6)$$

It can be seen from Expression (6) that each pixel of the intensity image data is given a value obtained by multiplying an exposure time T by an intermediate value A of the intensity of the light output from the illuminator 120. Furthermore, Expression (7) can be derived by substituting Expression (5) into Expression (2) that is used to derive the time-correlation image data. AT/2 represents the amplitude, and kx represents the phase.

$$C(x, y) = \int_0^T f(x, y, t) e^{-j\omega t} dt \quad (7)$$

$$= \int_0^T \left\{ A + \frac{A}{2} (e^{j(\omega t + kx)} + e^{-j(\omega t + kx)}) \right\} e^{-j\omega t} dt$$

$$= \frac{AT}{2} e^{jkx}$$

Hence, the time-correlation image data expressed as the complex number represented by Expression (7) can be replaced with the above-described two types of time-correlation image data. In other words, the time-correlation image data, which is constituted by the real part and the imaginary part as described above, includes a phase variation and an amplitude variation in the intensity variation of the light emitted to the inspection subject. That is, the PC 100 of the present embodiment can detect the phase variation and the amplitude variation of the light emitted from the illuminator 120 based on the two types of time-correlation image data. Hence, based on the time-correlation image data and the intensity image data, the PC 100 of the present embodiment generates amplitude image data that represents the amplitudes of light to be received for each pixel, and generates phase image data that represents the phase variations of light to be received for each pixel.

The PC 100 then detects abnormalities of the inspection subject based on the generated amplitude image data and the generated phase image data.

Meanwhile, when an abnormality based on a convexo-concave is present in the surface shape of the inspection subject, a variation corresponding to the abnormality is present in the distribution of normal vectors to the surface of the inspection subject. In addition, when an abnormality so as to absorb light is present on the surface of the inspection subject, a variation occurs in the intensity of reflected light. The variation in the distribution of normal vectors is detected as at least either one of the phase variation and the amplitude variation of the light. Therefore, in the present embodiment, the time-correlation image data and the intensity image data are used to detect at least either one of the phase variation and the amplitude variation of the light corresponding to the variation in the distribution of normal vectors. This enables the detection of the abnormality in the surface shape. The following describes relationships among the abnormality of the inspection subject, the normal vectors, and the phase variation or the amplitude variation of the light.

Figure 5:
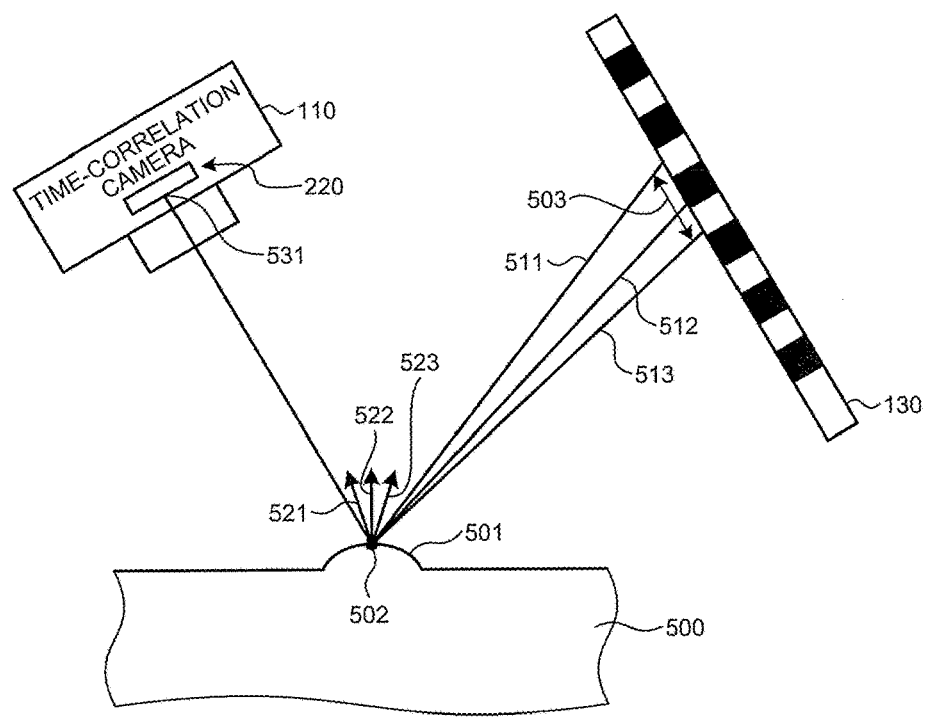
FIG. 5 is a diagram illustrating a first detection example of an abnormality of an inspection subject detected in the time-correlation camera of the first embodiment.

FIG. 5 is a diagram illustrating a first detection example of an abnormality of an inspection subject detected in the time-correlation camera 110 of the first embodiment. The example illustrated in FIG. 5 represents a state in which a convex-shaped abnormality 501 is present on an inspection subject 500. In that state, it can be seen that normal vectors 521, 522, and 523 are oriented in different directions in a region near a point 502 of the abnormality 501. Since the normal vectors 521, 522, and 523 are oriented in different directions, light reflected from the abnormality 501 diffuses (for example, as light 511, 512, and 513). Thus, a width 503 of the stripe pattern, which is received in any pixel 531 of the image sensor 220 of the time-correlation camera 110, increases.

Figure 6:
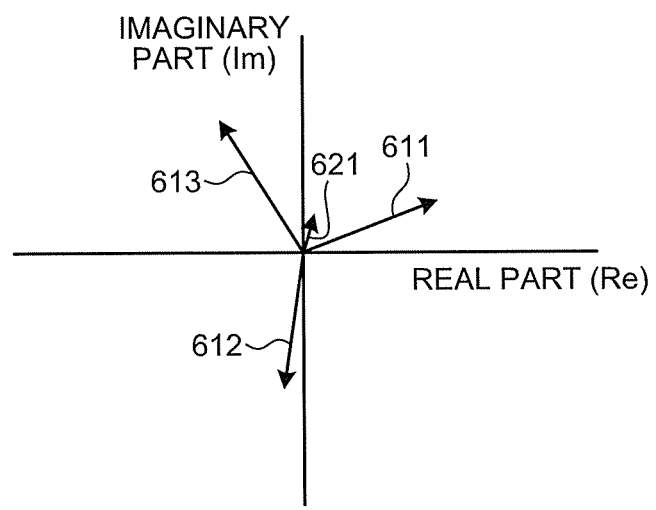
FIG. 6 is a diagram illustrating examples of amplitudes of light varying according to the abnormality illustrated in FIG. 5 when the abnormality is present on the inspection subject.

FIG. 6 is a diagram illustrating examples of amplitudes of light varying according to the abnormality 501 illustrated in FIG. 5 when the abnormality 501 is present on the inspection subject 500. In the example illustrated in FIG. 6, the amplitude of the light is divided into the real part (Re) and the imaginary part (Im), and represented on a two-dimensional plane. FIG. 6 illustrates that amplitudes 611, 612, and 613 of the light correspond to the light 511, 512, and 513 of FIG. 5. The amplitudes 611, 612, and 613 of the light cancel out one another, so that light having an amplitude 621 is received in the pixel 531 of the image sensor 220.

Consequently, in the state illustrated in FIG. 6, it can be seen that the amplitude is small in the region in which the abnormality 501 of the inspection subject 500 is captured. In other words, if the amplitude image data representing the amplitude variation includes a region darker than the surrounding area, the amplitudes of the light can be inferred to have canceled out one another in the darker region, so that the abnormality 501 can be determined to be present in a position of the inspection subject 500 corresponding to the darker region.

Figure 7:
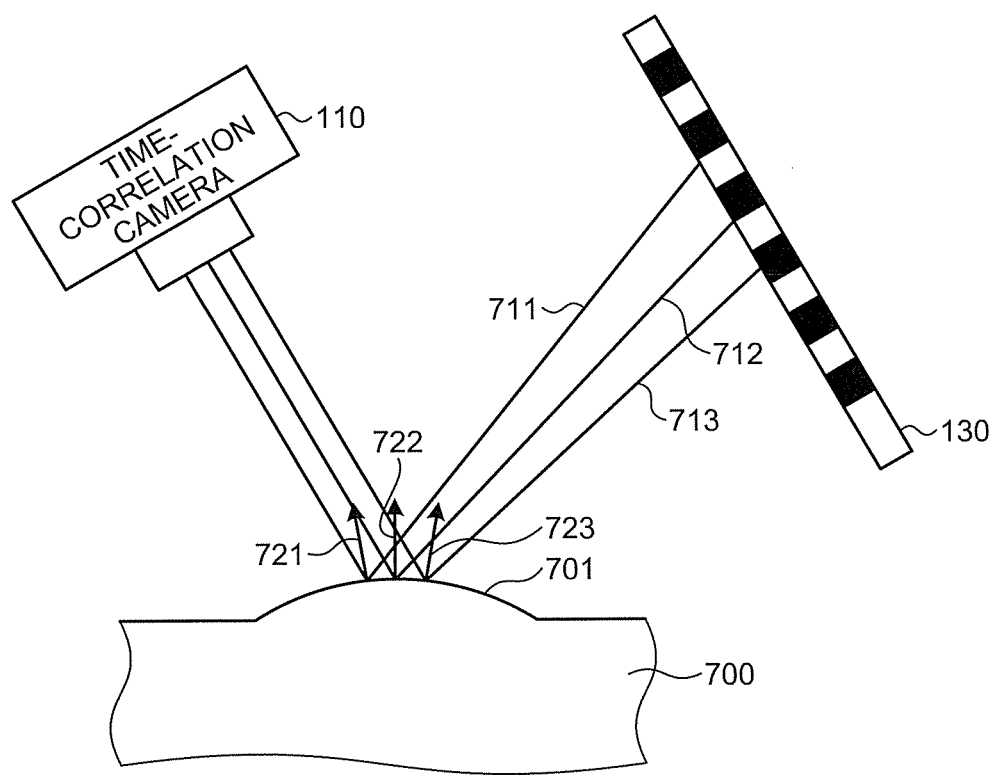
FIG. 7 is a diagram illustrating a second detection example of an abnormality of an inspection subject detected in the time-correlation camera of the first embodiment.

The inspection system of the present embodiment is not limited to detecting abnormalities having steeply changing inclination, such as the abnormality 501 of FIG. 5, but can also detect abnormalities having gradually changing inclination. FIG. 7 is a diagram illustrating a second detection example of an abnormality of an inspection subject detected in the time-correlation camera 110 of the first embodiment. In the example illustrated in FIG. 7, an inspection subject 700 has a gradual inclination 701, whereas a normal inspection subject has a flat surface (in other words, has parallel normal lines). In that state, normal vectors 721, 722, and 723 to the inclination 701 also vary gradually. Consequently, light 711, 712, and 713 received in the image sensor 220 also shift gradually. In the example illustrated in FIG. 7, the amplitudes of the light do not cancel out one another because of the gradual inclination 701. Therefore, in the example illustrated in FIG. 7, the amplitudes of the light hardly vary, unlike the case illustrated in FIGS. 5 and 6. However, although the light projected from the screen 130 should be normally received in the image sensor while remaining parallel to one another, the gradual inclination 701 prevents the light projected from the screen 130 from being received in the image sensor in the parallel state. Thereby, the phase variation of the light occurs. Accordingly, the abnormality caused by the gradual inclination 701 illustrated in FIG. 7 can be detected by detecting a difference from, for example, the surrounding area regarding the phase variation of the light.

Figure 8:
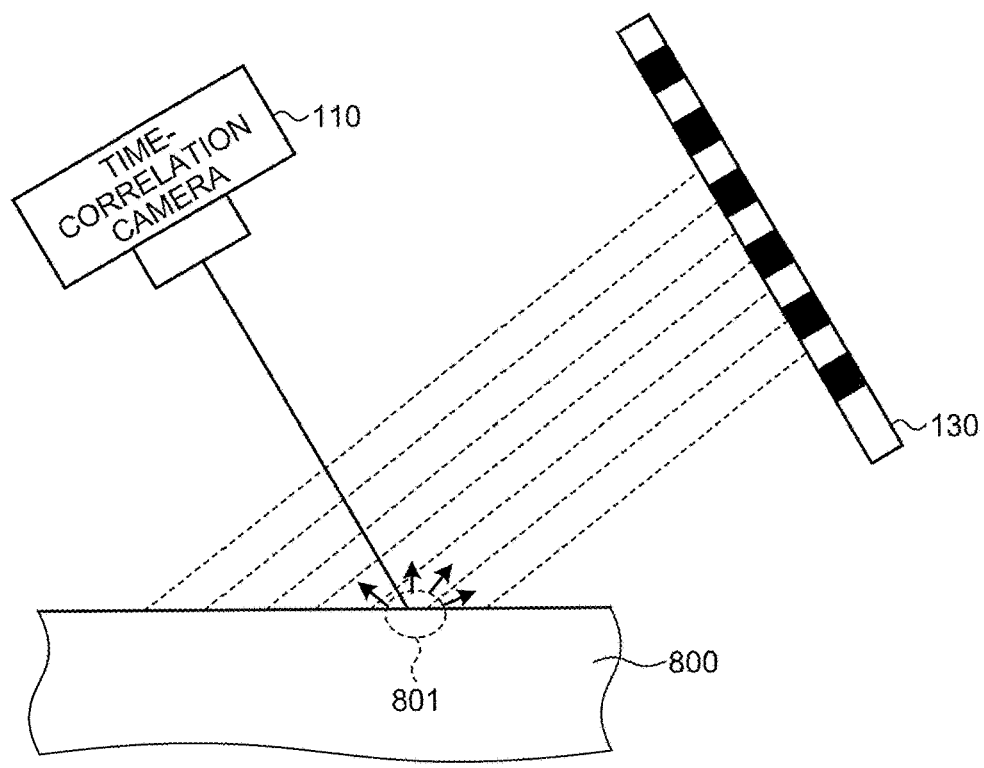
FIG. 8 is a diagram illustrating a third detection example of an abnormality of an inspection subject detected in the time-correlation camera of the first embodiment.

Abnormalities may occur in other things than the surface shape of the inspection subject (i.e., the distribution of normal vectors of the inspection subject) in some cases. FIG. 8 is a diagram illustrating a third detection example of an abnormality of an inspection subject detected in the time-correlation camera 110 of the first embodiment. In the example illustrated in FIG. 8, dirt 801 is attached to an inspection subject 800, thereby the light emitted from the illuminator 120 is absorbed or diffusely reflected, and the light thus hardly varies in intensity in any pixel region of the time-correlation camera 110 involved in capturing of the dirt 801. In other words, an example is illustrated in which, in any pixel region involved in capturing of the dirt 801, the phase canceling occurs in the light intensity to cancel out the vibrational components, so that almost direct current-like brightness is obtained.

In that case, the amplitude of the light is minimal in the pixel region involved in capturing of the dirt 801, so that a region darker than the surrounding area is present when the amplitude image data is displayed. Consequently, it can be inferred that the abnormality, such as dirt 801, is present in a position of the inspection subject 800 corresponding to the darker region.

Thus, in the present embodiment, it can be inferred that an abnormality is present in the inspection subject by detecting the variations in the amplitude and the phase of the light based on the time-correlation image data.

Referring back to FIG. 1, the PC 100 will be described. The PC 100 controls the entire inspection system. The PC 100 includes an arm controller 101; an illumination controller 102; and a controller 103.

The arm controller 101 controls the arm 140 to change a surface of the inspection subject 150 to be captured by the time-correlation camera 110. In the present embodiment, a plurality of surfaces of the inspection subject to be captured is set in advance with the PC 100. According to this setting, for each time the time-correlation camera 110 finishes capturing the inspection subject 150, the arm controller 101 controls the arm 140 to move the inspection subject 150 so that the time-correlation camera 110 can capture the set surfaces. The present embodiment is not limited to repeating to move the arm each time the capturing is finished and stopping the arm before the capturing starts. In the present embodiment, the arm 140 may be continuously driven. The arm 140 can be called, for example, a conveyer, a moving unit, a position changer, or an attitude changer.

The illumination controller 102 outputs the stripe pattern to be emitted by the illuminator 120 to inspect the inspection subject 150. The illumination controller 102 of the present embodiment transfers at least three stripe patterns to the illuminator 120, and instructs the illuminator 120 so as to switch the stripe patterns to be alternately displayed during the exposure time.

Figure 9:
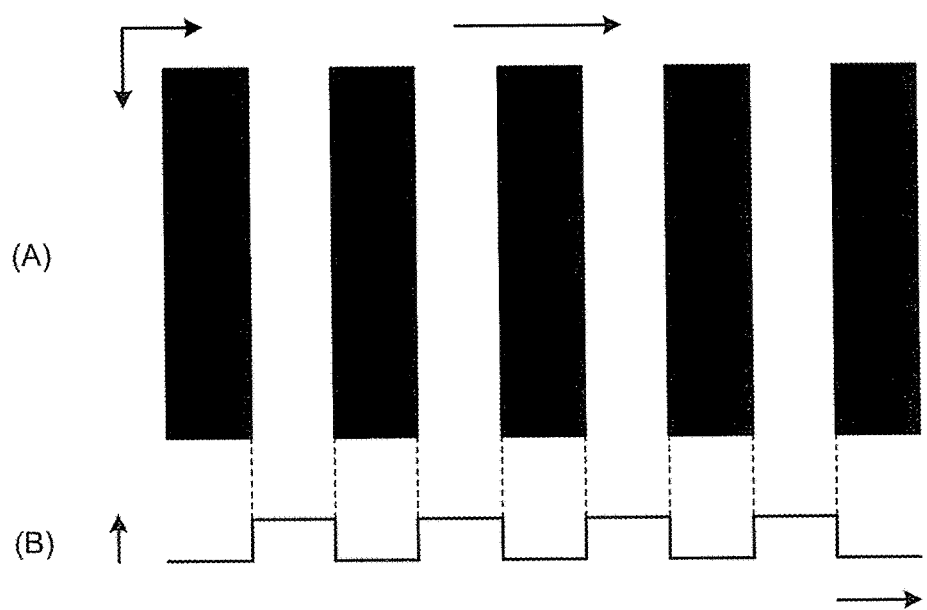
FIG. 9 is a diagram illustrating an example of a stripe pattern output to the illuminator by an illumination controller of the first embodiment.

FIG. 9 is a diagram illustrating an example of a stripe pattern output to the illuminator 120 by the illumination controller 102. The illumination controller 102 performs control so as to output the stripe pattern in which black regions and white regions illustrated in (A) of FIG. 9 are arranged according to a rectangular wave illustrated in (B) of FIG. 9.

The interval between stripes in each of the stripe patterns emitted in the present embodiment is set according to the size of the abnormality (defect) to be detected, and will not be described here in detail.

The angular frequency ω of the rectangular wave to output the stripe pattern has the same value as the angular frequency ω of the reference signal.

Figure 10:
FIG. 10 is a diagram illustrating an example of a shape of a wave representing the stripe pattern after passing through a screen of the first embodiment.

As illustrated in FIG. 9, the stripe pattern output by the illumination controller 102 can be represented as the rectangular wave. However, the stripe pattern output by the illumination controller can be approximated to a sinusoidal wave by blurring the boundary regions of the stripe pattern through the screen 130, that is, by moderating (blunting) the intensity variation of the light at the boundaries between the bright regions (regions of stripes) and the dark regions (regions of intervals) in the stripe pattern. FIG. 10 is a diagram illustrating an example of a shape of a wave representing the stripe pattern after passing through the screen 130. Approximating the shape of the wave to the sinusoidal wave as illustrated in FIG. 10 can improve the measurement accuracy. The stripes may be provided with additional gray regions in which brightness changes in multiple steps, or provided with gradations. The stripe pattern may include color stripes.

Referring back to FIG. 1, the controller 103 includes an amplitude/phase image generator 104 and an abnormality detection processor 105. The controller 103 performs processing to calculate a characteristic with the intensity image data and the time-correlation image data received from the time-correlation camera 110. The characteristic corresponds to the distribution of normal vectors to the inspection target surface of the inspection subject 150 and serves to detect an abnormality based on the difference from the surrounding area. In the present embodiment, to perform the inspection, the controller 103 receives, instead of the time-correlation image data represented by complex numbers (called "complex time-correlation image data"), the two types of time-correlation image data obtained by dividing the complex time-correlation image data into the real part and the imaginary part, from the time-correlation camera 110.

The amplitude/phase image generator 104 generates the amplitude image data and the phase image data based on the intensity image data and the time-correlation image data received from the time-correlation camera 110.

The amplitude image data is image data representing amplitudes of the light received for each pixel. The phase image data is image data representing phases of the light received for each pixel.

The present embodiment does not limit the method for calculating the amplitude image data. For example, the amplitude/phase image generator 104 can derive each pixel value $F(x,y)$ of the amplitude image data from the pixel values $C1(x,y)$ and $C2(x,y)$ of the two types of time-correlation image data, based on Expression (8).

$$F(x,y)=\sqrt{C1(x,y)^2+C2(x,y)^2} \quad (8)$$

In the present embodiment, whether any region has an abnormality can be determined based on the pixel values (amplitudes) of the amplitude image data and the pixel values of the intensity image data. For example, it can be inferred that no abnormality is present in a region where values obtained by dividing the pixel values (AT) of the intensity image data by 2 agree to some extent with the amplitudes (AT/2 if no canceling out occurs) of the amplitude image data. By contrast, it can be inferred that the amplitudes are canceling out one another in a region where the values do not agree. Specific methods will be described later.

In the same manner, the amplitude/phase image generator 104 can derive each pixel value $P(x,y)$ of the phase image data from the pixel values $C1(x,y)$ and $C2(x,y)$ based on Expression (9).

$$P(x, y) = \arctan\left(\frac{C2(x, y)}{C1(x, y)}\right) \quad (9)$$

The abnormality detection processor 105 detects a characteristic, which corresponds to the distribution of normal vectors to the inspection target surface and relates to an abnormality of the inspection subject 150 based on the difference from the surrounding area, with the amplitude image data and the phase image data generated by the amplitude/phase image generator 104. In the present embodiment, it will be described a distribution of amplitudes of the complex time-correlation image is used as the characteristic corresponding to the distribution of normal vectors, as an example. Herein, the distribution of amplitudes of the complex time-correlation image is data representing a distribution of amplitudes of the pixels in the complex time-correlation image, and corresponds to the amplitude image data.

Figure 11:
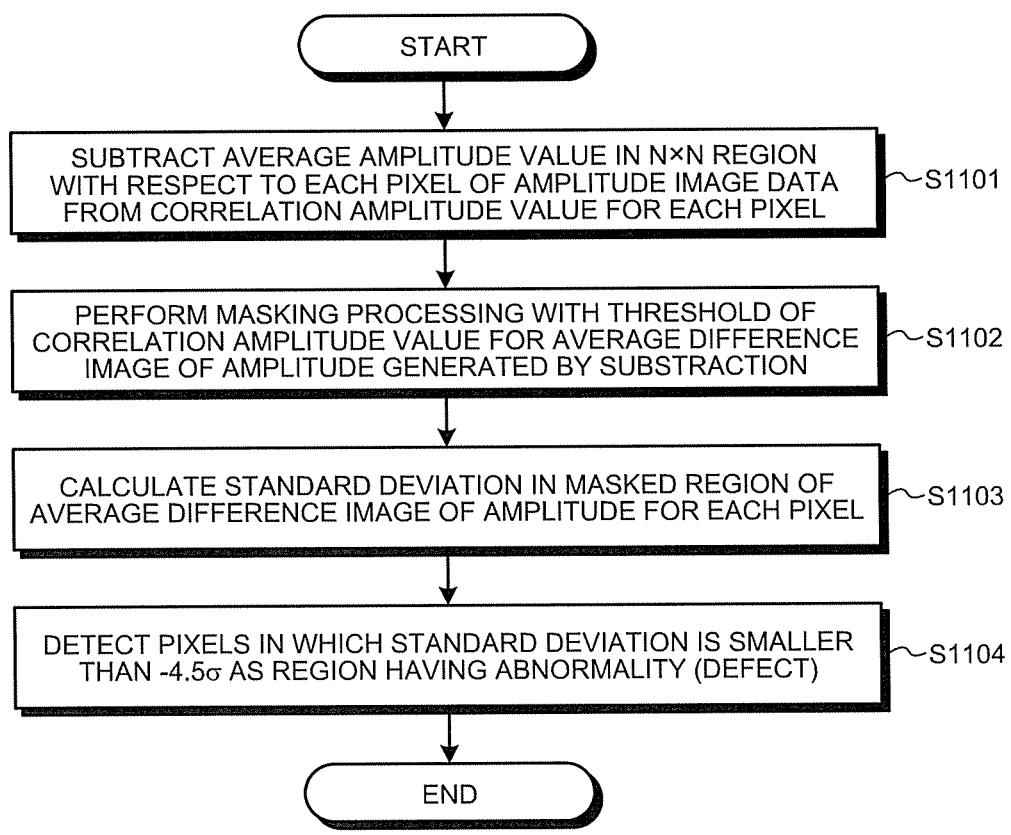
FIG. 11 is a flowchart illustrating a procedure of abnormality detection processing based on amplitudes by an abnormality detection processor of the first embodiment.

The following describes abnormality detection processing based on the amplitudes in the abnormality detection processor 105 in the present embodiment. FIG. 11 is a flowchart illustrating a procedure of the processing by the abnormality detection processor 105 of the present embodiment.

First, the abnormality detection processor 105 subtracts an average amplitude value in an N×N region with respect to (for example, centering on) each pixel of the amplitude image data from an amplitude value (pixel value representing the amplitude value) of light stored in the pixel (Step S1101). The abnormality detection processor 105 then generates average difference image data of the amplitude. The average difference image data of the amplitude corresponds to a gradient of amplitude. The integer N is set to an appropriate value depending on the implementation.

The abnormality detection processor 105 then performs masking processing with a predetermined threshold for the amplitude for the average difference image data of the amplitude generated by the subtraction (Step S1102).

The abnormality detection processor 105 further calculates a standard deviation in the masked region of the average difference image data for each pixel (Step S1103). In the present embodiment, a method based on the standard deviation is described. However, embodiments are not limited to the case of using the standard deviation. For example, an average value may be used.

The abnormality detection processor 105 detects pixels in which values obtained by subtracting the average value from the amplitude pixel values are smaller than −4.5σ (σ is the standard deviation), as a region having an abnormality (defect) (Step S1104).

According to the above-described procedure, the abnormality of the inspection subject can be detected based on the amplitude values (i.e., the distribution of the amplitudes) of the pixels. The present embodiment is, however, not limited to detecting an abnormality based on the distribution of amplitudes of the complex time-correlation image. A gradient of a distribution of phases may be used as the characteristic corresponding to the distribution of normal vectors to the inspection target surface. Thus, an example of using the gradient of the distribution of phases will be described below.

Figure 12:
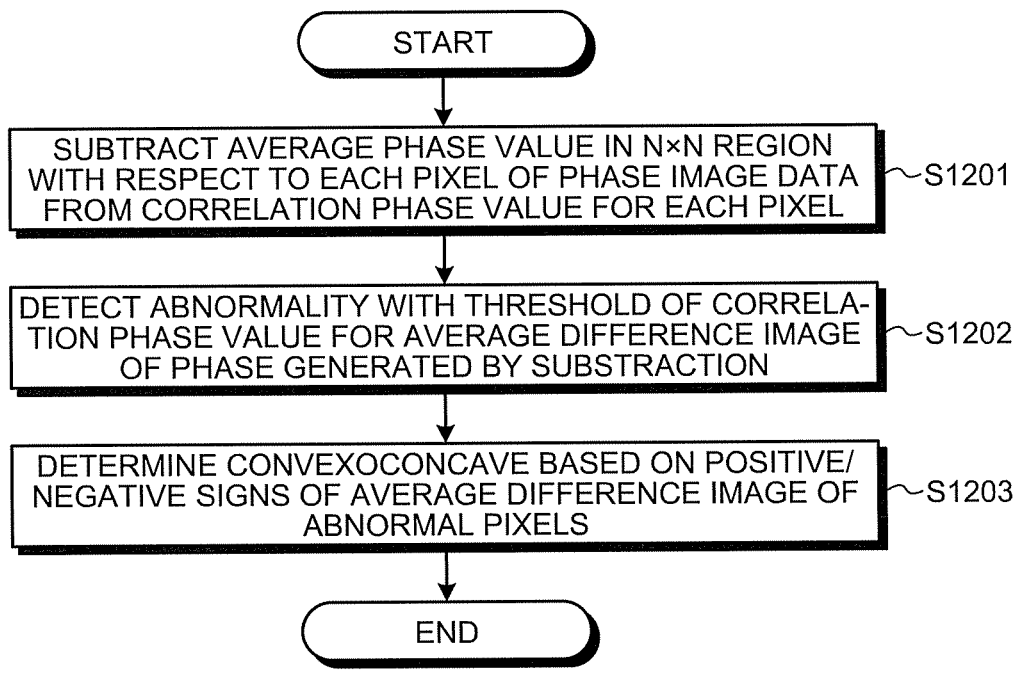
FIG. 12 is a flowchart illustrating a procedure of the abnormality detection processing based on phases by the abnormality detection processor of the first embodiment.

The following describes the abnormality detection processing based on the phases in the abnormality detection processor 105 of the present embodiment. FIG. 12 is a flowchart illustrating a procedure of the processing in the abnormality detection processor 105 of the present embodiment.

First, the abnormality detection processor 105 subtracts an average phase value in an N×N region with respect to (for example, centering on) each pixel of the phase image data from a phase value (pixel value representing the phase value) of light in the pixel (Step S1201). The abnormality detection processor 105 then generates average difference image data of the phase. The average difference image data of the phase corresponds to a gradient of phase.

The abnormality detection processor 105 then compares the size (absolute value) of the average difference image data of the phase generated by the subtraction with a threshold, and detects pixels in which the size of the average difference image data is equal to or higher than the threshold, as pixels having abnormalities (defects) (Step S1202).

From the detection result at Step S1202, the abnormality detection processor 105 can determine convexoconcave based on the positive/negative signs of the average difference image data, that is, based on the magnitude relationships between the phase values of the pixels and the average phase value (Step S1203). Which of the phase value of the pixel and the average phase value is larger than the other when the abnormality is convex depends on settings of various parts. However, different magnitude relationships represent different convexoconcave.

An abnormality can be detected based on the gradient of the distribution of phases obtained by another method. As another method, for example, the abnormality detection processor 105 can detect that a pixel has an abnormality (defect) when a difference in magnitude, which is between an average vector in an N×N region of normalized time-correlation image data and a normalized vector in the pixel, is higher than a threshold. The information to be used for detecting the abnormality is not limited to the gradient of the distribution of phases. The abnormality of the inspection subject may be detected based on information corresponding to the distribution of phases.

Figure 13:
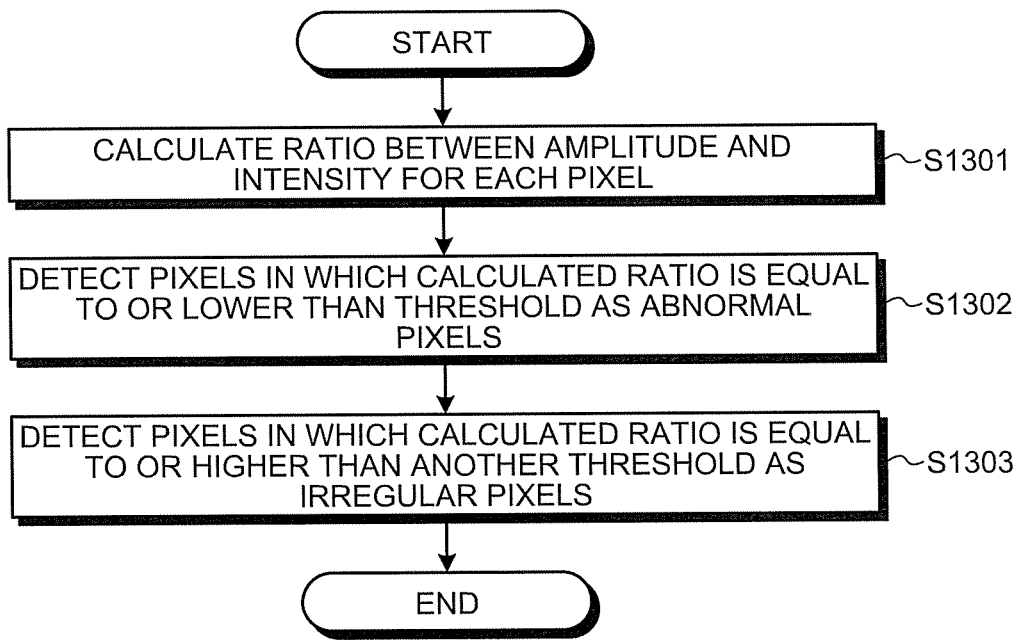
FIG. 13 is a flowchart illustrating a procedure of the abnormality detection processing based on the amplitudes and intensities by the abnormality detection processor of the first embodiment.

The following describes the abnormality detection processing based on the amplitudes and intensities in the abnormality detection processor 105 of the present embodiment. FIG. 13 is a flowchart illustrating a procedure of the processing by the abnormality detection processor 105 of the present embodiment.

First, the abnormality detection processor 105 calculates, with Expression (100) below, a ratio R(x,y) between (a pixel value representing) the amplitude C(x,y) (see Expression (7)) and (a pixel value representing) the intensity G(x,y) (see Expression (6)) for each pixel based on the time-correlation image data and the intensity image data (Step S1301).

$$R(x,y)=C(x,y)/G(x,y) \tag{100}$$

The abnormality detection processor 105 then compares the ratio R(x,y) with a threshold, and detects pixels in which the values of the ratio R(x,y) is equal to or lower than the corresponding threshold, as pixels having abnormalities (defects) (Step S1302). The abnormality detection processor 105 also compares the ratio R(x,y) with another threshold, and detects pixels in which the values of the ratio R(x,y) is equal to or higher than the other corresponding threshold, as pixels having irregularities (such as dirt) (Step S1303). If an abnormality in the distribution of normal vectors significantly cancels out (reduces) the amplitudes, the amplitudes decrease more significantly than the intensities. If, instead, the light is significantly absorbed by dirt or the like on the surface of the inspection subject 150 while the distribution of normal vectors is so abnormal, the intensities decrease more significantly than the amplitudes. Consequently, the abnormality detection processor 105 can detect an abnormality type through Steps S1302 and S1303.

Figure 14:
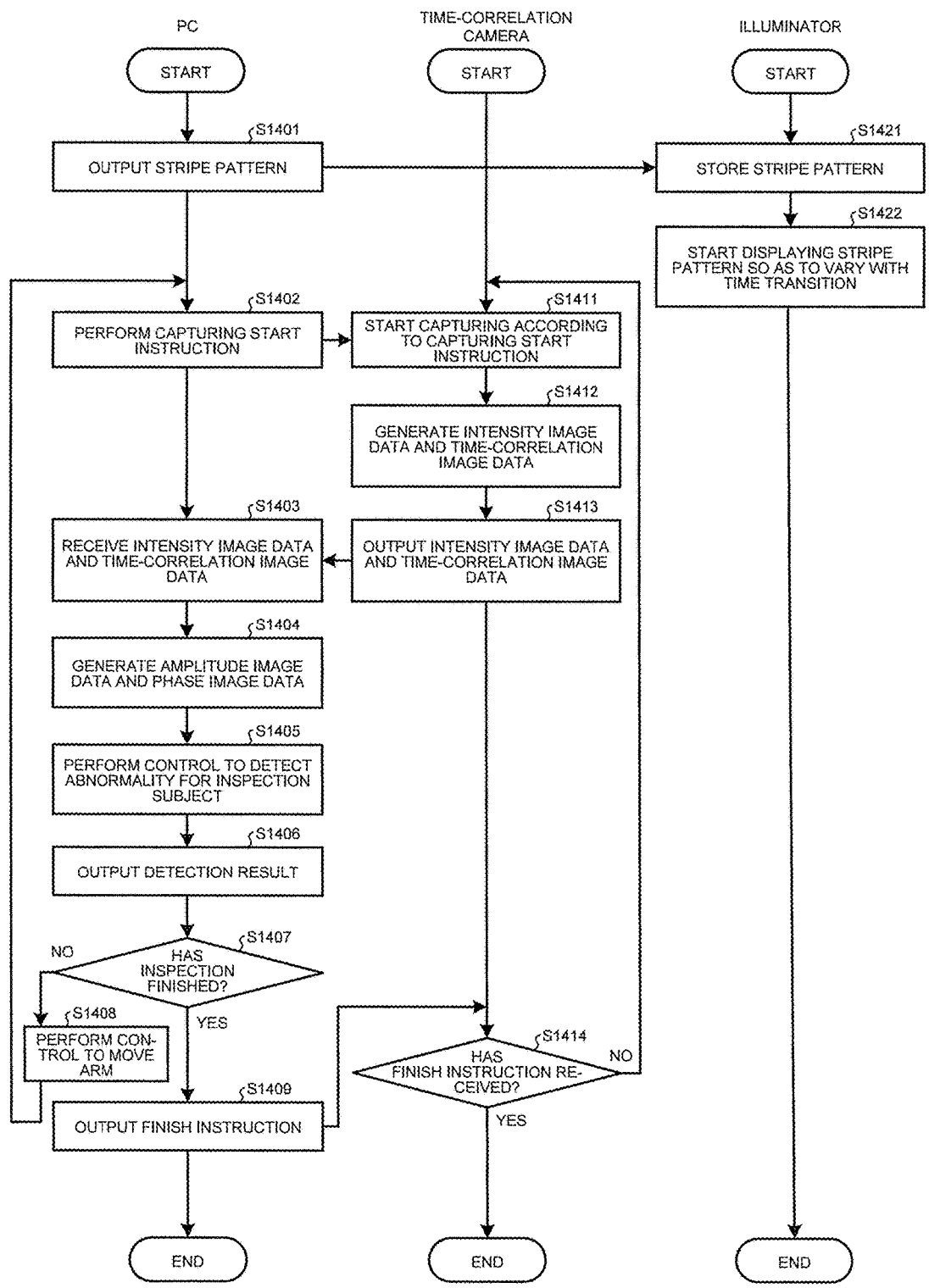
FIG. 14 is a flowchart illustrating a procedure of inspection processing for the inspection subject by the inspection system of the first embodiment.

The following describes inspection processing of the inspection subject in the inspection system of the present embodiment. FIG. 14 is a flowchart illustrating a procedure of the processing mentioned above by the inspection system of the present embodiment. The inspection subject 150 is already fixed to the arm 140, and placed in an initial position of the inspection.

The PC 100 of the present embodiment outputs the stripe pattern to inspect the inspection subject to the illuminator 120 (Step S1401).

The illuminator 120 stores therein the stripe pattern received from the PC 100 (Step S1421). The illuminator 120 displays the stored stripe pattern so as to vary with time transition (Step S1422). The condition for the start of the display by the illuminator 120 is not limited to the time of storing of the stripe pattern. The condition may be the time when an inspector performs an operation to start the illuminator 120, for example.

The controller 103 of the PC 100 transmits a capturing start instruction to the time-correlation camera 110 (Step S1402).

Then, according to the received capturing instruction, the time-correlation camera 110 starts capturing a region including the inspection subject 150 (Step S1411). Then, the controller 240 of the time-correlation camera 110 generates the intensity image data and the time-correlation image data (Step S1412). The controller 240 of the time-correlation camera 110 outputs the intensity image data and the time-correlation image data to the PC 100 (Step S1413).

The controller 103 of the PC 100 receives the intensity image data and the time-correlation image data (Step S1403). The amplitude/phase image generator 104 generates the amplitude image data and the phase image data from the received intensity image data and the received time-correlation image data (Step S1404).

The abnormality detection processor 105 performs control to detect the abnormality for the inspection subject based on the amplitude image data and the phase image data (Step S1405). The abnormality detection processor 105 outputs the abnormality detection result to a display device (not illustrated) included in the PC 100 (Step S1406).

Conceivable examples of the output of the abnormality detection result include an example in which the intensity image data is displayed, and a region of the intensity image data, which corresponds to a region detected to have an abnormality based on the amplitude image data and the phase image data, is decoratively displayed so as to allows the inspector to recognize the abnormality. The detection result of the abnormality is not limited to being output based on vision, but may be output, for example, as sound.

The controller 103 determines whether the inspection of the inspection subject has finished (Step S1407). If not (No at Step S1407), the arm controller 101 performs control to move the arm according to a predetermined setting so that the time-correlation camera 110 can capture a surface of an inspection subject to be inspected next (Step S1408). After the movement control of the arm has finished, the controller 103 transmits again the capturing start instruction to the time-correlation camera 110 (Step S1402).

If the inspection of the inspection subject is determined to have finished (Yes at Step S1407), the controller 103 outputs an finish instruction to the time-correlation camera 110 (Step S1409), and the process is then ended.

The time-correlation camera 110 determines whether the finish instruction is received (Step S1414). If not (No at Step S1414), the time-correlation camera 110 performs the process again from Step S1411. If the finish instruction is received (Yes at Step S1414), the process is then ended.

The processing performed by the illuminator 120 may be ended by the inspector, or may be ended according to an instruction from another component.

In the present embodiment, it has been described that the intensity image data and the time-correlation image data has been generated with the time-correlation camera 110, for example. However, the embodiments are not limited to using the time-correlation camera 110 to generate the intensity image data and the time-correlation image data, but may use a time-correlation camera that can generate the intensity image data and the time-correlation image data through analog processing, or a capturing system that performs an operation equivalent to that of the time-correlation camera. For example, the time-correlation image data may be generated by using an ordinary digital still camera to generate and output image data, and by allowing an information processing device to use the image data generated by the digital still camera as frame image data to superimpose the reference signals. In addition, the time-correlation image data may be generated using a digital camera that can superimpose the reference signals on the light intensity signals in an image sensor.

<First Modification>

In the present embodiment, it has been described that a characteristic related to an abnormality has been detected based on a difference from the surrounding area. However, the embodiments are not limited to detecting the characteristic based on a difference from the surrounding area, but may detect the characteristic based on a difference from data of a reference shape (reference data, such as the time-correlation data, the amplitude image data, or the phase image data). In this case, the spatially phase-modulated illumination (stripe pattern) needs to be aligned in position and synchronized with that in the case of the reference data.

In a first modification, the abnormality detection processor 105 compares the amplitude image data and the phase image data obtained from a reference surface stored in advance in a storage (not illustrated) with the amplitude image data and the phase image data of the inspection subject 150. The abnormality detection processor 105 then determines whether a difference equal to or larger than a predetermined reference value is present in at least one of the amplitude of light and the phase of light between the surface of the inspection subject 150 and the reference surface.

In the present modification, for example, an inspection system having the same configuration as that of the first embodiment is used, and a surface of a normal inspection subject is used as the reference surface.

While the illuminator 120 is emitting the stripe pattern through the screen 130, the time-correlation camera 110 captures the surface of the normal inspection subject, and generates the time-correlation image data. The PC 100 receives the time-correlation image data generated by the time-correlation camera 110, generates the amplitude image data and the phase image data, and stores the amplitude image data and the phase image data in a storage (not illustrated) of the PC 100. The time-correlation camera 110 captures an inspection subject to be determined whether any abnormality is present, and generates the time-correlation image data. The PC 100 generates the amplitude image data and the phase image data from the time-correlation image data, and then, compares the amplitude image data and the phase image data with the amplitude image data and the phase image data of the normal inspection subject stored in the storage. At that time, the PC 100 outputs, as data representing a characteristic to detect an abnormality, the result of the comparison of the amplitude image data and the phase image data of the normal inspection subject with the amplitude image data and the phase image data of the inspection subject to be inspected. If the characteristic to detect an abnormality is equal to or larger than the predetermined reference value, the inspection subject 150 is inferred to have an abnormality.

In this manner, the present modification can determine whether a difference is present from the surface of the normal inspection subject, in other words, whether any abnormality is present on the surface of the inspection subject. Any method can be used as a method for comparison of the amplitude image data and the phase image data, so that description of the method will not be given.

In the present modification, it has been described that the data representing the characteristic for detecting an abnormality has been output based on a difference from the reference surface, for example. However, the characteristic to detect an abnormality may be calculated based on a combination of the difference from the reference surface and the difference from the surrounding area described in the first embodiment. Any method can be used as a method of the combination, so that description of the method will not be given.

<Second modification>

In the first embodiment, it has been described the abnormality (defect) of the inspection subject has been detected by moving the stripe pattern in the x-direction. However, if the inspection subject has an abnormality (defect) that steeply changes the distribution of normal lines in the y-direction orthogonal to the x-direction, the defect can be detected more easily by moving the stripe pattern in the y-direction than by moving the stripe pattern in the x-direction, in some cases. Thus, a second modification will be described by way of an example of alternately switching between the stripe pattern moving in the x-direction and the stripe pattern moving in the y-direction.

The illumination controller 102 of the present modification switches the stripe pattern output to the illuminator 120 at predetermined time intervals. Due to this, the illuminator 120 outputs a plurality of stripe patterns extending in different directions to one inspection target surface.

FIG. 15 is a diagram illustrating a switching example between the stripe patterns output by the illumination controller 102 according to the present modification. In (A) of FIG. 15, the illumination controller 102 shifts the stripe pattern displayed by the illuminator 120 in the x-direction. The illumination controller 102 then shifts the stripe pattern displayed by the illuminator 120 in the y-direction, as illustrated in (B) of FIG. 15.

The controller 103 of the PC 100 performs the abnormality detection based on the time-correlation image data obtained by emitting the stripe pattern illustrated in (A) of FIG. 15, and performs the abnormality detection based on the time-correlation image data obtained by emitting the stripe pattern illustrated in (B) of FIG. 15.

Figure 16:
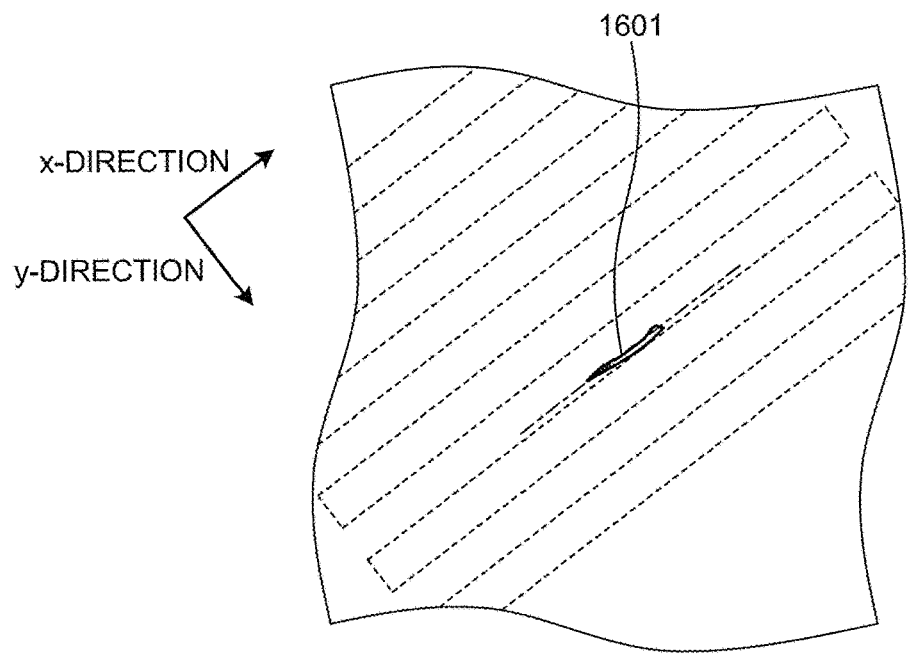
FIG. 16 is a diagram illustrating an example in which the illumination controller of the second modification emits a stripe pattern onto a surface including an abnormality (defect).

FIG. 16 is a diagram illustrating an example in which the illumination controller 102 of the present modification emits the stripe pattern onto a surface including an abnormality (defect) 1601. In the example illustrated in FIG. 16, the abnormality (defect) 1601 extends in the x-direction. In this case, the illumination controller 102 performs setting so that the stripe pattern moves in the y-direction intersecting the x-direction, in other words, in a direction intersecting the longitudinal direction of the abnormality (defect) 1601. This setting can improve the detection accuracy.

Figure 17:
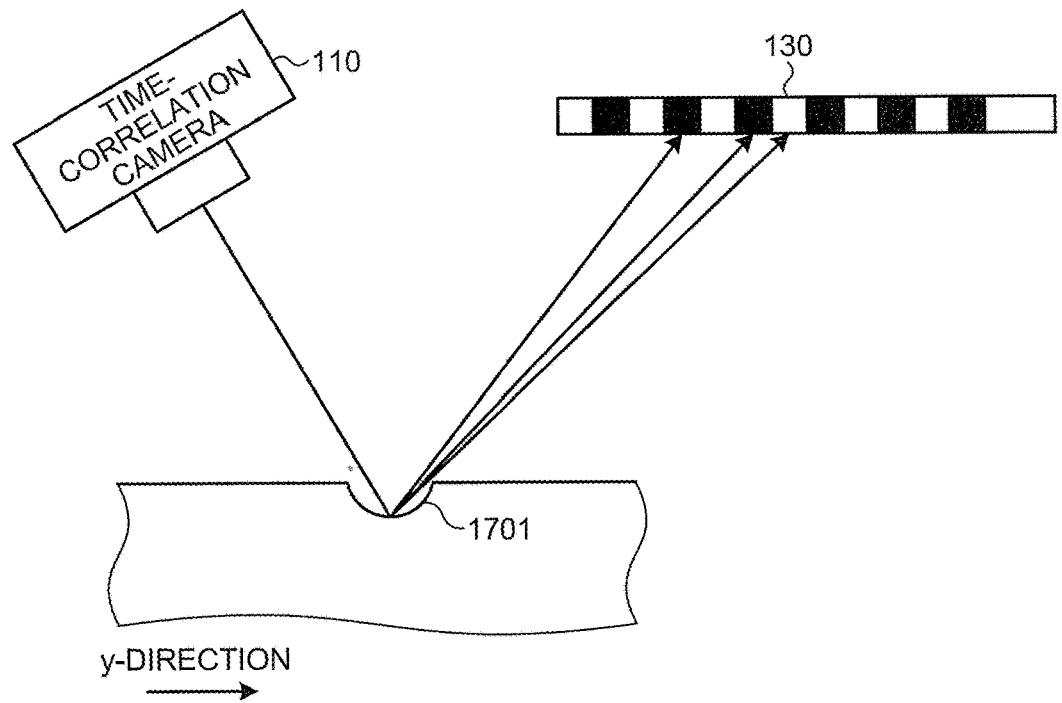
FIG. 17 is a diagram illustrating a relationship between an abnormality (defect) and the stripe pattern on the screen when the stripe pattern changes in the y-direction.

FIG. 17 is a diagram illustrating a relationship between an abnormality (defect) 1701 and the stripe pattern on the screen 130 when the stripe pattern changes in the y-direction, in other words, in the direction orthogonal to the longitudinal direction of the abnormality 1601. As illustrated in FIG. 17, when the abnormality (defect) 1701 is present that is narrow in the y-direction and has a longitudinal direction in the x-direction intersecting the y-direction, the amplitudes of the light emitted from the illuminator 120 greatly cancel out one another in the y-direction intersecting the x-direction. Due to this, the PC 100 can detect the abnormality (defect) from the amplitude image data corresponding to the stripe pattern moved in the y-direction.

In the inspection system of the present modification, when the longitudinal direction of the defect present on the inspection subject is at random, displaying the stripe patterns in a plurality of directions (e.g., in the x-direction and the y-direction intersecting the x-direction) enables detection of the defect regardless of the shape of the defect, and thus can improve the detection accuracy of the abnormality (defect). In addition, projecting a stripe pattern matching the shape of the abnormality can improve the detection accuracy of the abnormality.

<Third Modification>

The above-described second modification does not limit the method for switching the stripe pattern when the abnormality detection in the x-direction and the abnormality detection in the y-direction are performed. Thus, a third modification will be described by way of an example of moving a stripe pattern output to the illuminator 120 by the illumination controller 102 simultaneously in the x-direction and the y-direction.

Figure 18:
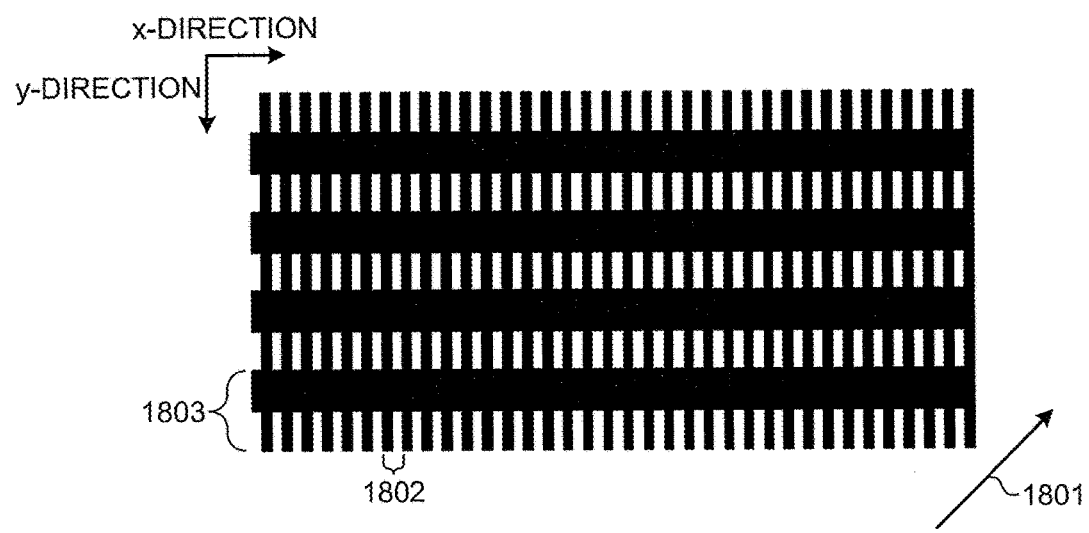
FIG. 18 is a diagram illustrating an example of a stripe pattern output to the illuminator by the illumination controller according to a third modification.

FIG. 18 is a diagram illustrating an example of the stripe pattern output to the illuminator 120 by the illumination controller 102 according to the present modification. In the example illustrated in FIG. 18, the illumination controller 102 moves the stripe pattern in a direction 1801.

The stripe pattern illustrated in FIG. 18 includes a stripe pattern at a period 1802 in the x-direction and a stripe pattern at a period 1803 in the y-direction. That is, the stripe pattern illustrated in FIG. 18 includes a plurality of stripe patterns having different widths and extending in intersecting directions. The stripe width of the stripe pattern in the x-direction needs to differ from the stripe width of the stripe pattern in the y-direction. Thereby, when the time-correlation image data corresponding to the x-direction and the time-correlation image data corresponding to the y-direction are generated, the corresponding reference signals can differ from each other. It is only necessary to change the period (frequency) of variation in the intensity of light caused by the stripe pattern, and the moving speed of the stripe pattern (stripes) may be changed instead of changing the width of the stripes.

The time-correlation camera 110 generates the time-correlation image data corresponding to the stripe pattern in the x-direction based on the reference signal corresponding to the stripe pattern in the x-direction, and generates the time-correlation image data corresponding to the stripe pattern in the y-direction based on the reference signal corresponding to the stripe pattern in the y-direction. The controller 103 of the PC 100 performs the abnormality detection based on the time-correlation image data corresponding to the stripe pattern in the x-direction, and then performs the abnormality detection based on the time-correlation image data corresponding to the stripe pattern in the y-direction. In this manner, the present modification enables the detection regardless of the direction of the defect, and thus can improve the detection accuracy of the abnormality (defect).

<Second embodiment>

The first embodiment has been described by way of the example in which the illuminator 120 displays the stripe pattern having one kind of stripe width in the x-direction. However, the above-described embodiments do not limit the stripe width in the x-direction to one kind. The stripes may have a plurality of kinds of widths in the x-direction. Thus, a second embodiment will be described by way of an example in which the stripes have a plurality of kinds of widths in the x-direction.

The present embodiment is an example in which it is determined whether an abnormality present on the inspection subject has a convex shape using a plurality of kinds of x-directional stripe widths are used, in other words, a plurality of stripe patterns of different stripes are used, for one inspection target surface of the inspection subject.

Since an inspection system of the second embodiment has the same configuration as the inspection system of the first embodiment, description of the inspection system will not be given. The following describes a stripe pattern output by the illumination controller 102 of the second embodiment.

Figure 19:
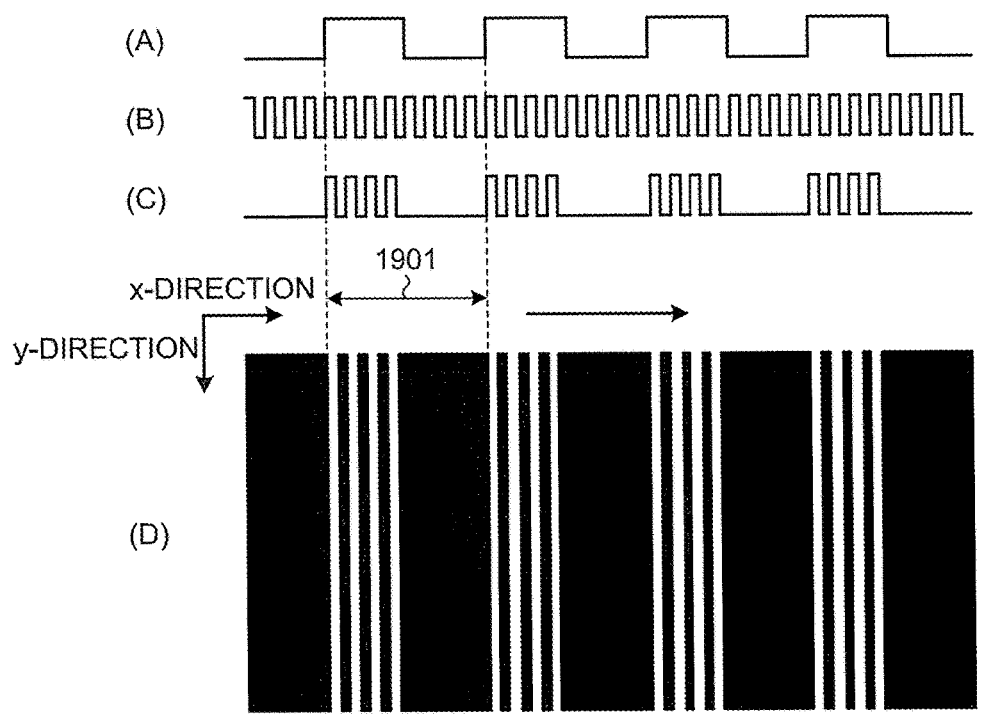
FIG. 19 is a diagram illustrating an example of a stripe pattern output to the illuminator by the illumination controller according to a second embodiment.

FIG. 19 is a diagram illustrating an example of the stripe pattern output to the illuminator 120 by the illumination controller 102 of the second embodiment. As illustrated in FIG. 19, the illumination controller 102 performs control so as to output the stripe pattern having a plurality of stripes that have different widths and extend in the same direction.

In the example illustrated in FIG. 19, the illumination controller 102 outputs a stripe pattern (D) corresponding to a rectangular wave (C) obtained by superimposing a rectangular wave (A) on a rectangular wave (B) illustrated in FIG. 19. In the present embodiment, the rectangular wave (B) completes eight cycles while the rectangular wave (A) completes one cycle in a distance 1901.

In the present embodiment, the number of stripes represented by the rectangular wave (B) is set so as to be even number times the number of stripes represented by the rectangular wave (A). This is based on the principle that a rectangular wave is obtained by superimposing odd harmonic components, so that the rectangular wave (B) is prevented from interfering with harmonic components by having a frequency even number times that of the rectangular wave (A).

In the case of performing analysis processing using a plurality of kinds of stripe patterns, it is preferable to provide appropriate differences in stripe width among the kinds of stripe patterns. For example, a desirable analysis result can be obtained when the stripe width of one kind of stripes is six or more times the stripe width of the other kind of stripes. Hence, as an example in the present embodiment, the stripe width of one kind of stripes is set to be eight times the stripe width of the other kind of stripes.

In the present embodiment, the example has been described in which the rectangular wave (B) completes eight cycles while the rectangular wave (A) completes one cycle. However, the embodiments are not limited to such an example. There may be a difference in the frequency (period) between the rectangular wave (A) and the rectangular wave (B).

The illuminator 120 emits the stripe pattern illustrated in FIG. 19 output from the illumination controller 102 through the screen 130 to the inspection subject 150. Along with this operation, the time-correlation camera 110 captures the light of the stripe pattern illustrated in FIG. 19 reflected from the inspection subject. The time-correlation camera 110 of the present embodiment generates two series of time-correlation image data as capturing results.

Specifically, the time-correlation camera 110 generates the time-correlation image data corresponding to the stripe pattern of the rectangular wave (A) based on the reference signal corresponding to the stripe pattern of the rectangular wave (A), and generates the time-correlation image data corresponding to the stripe pattern of the rectangular wave (B) based on the reference signal corresponding to the stripe pattern of the rectangular wave (B). The two kinds (two series) of time-correlation image data thus output and the intensity image data are output to the PC 100. Each of the two kinds of time-correlation image data includes the real part and the imaginary part of the corresponding time-correlation image data, as described in the first embodiment.

Then, the controller 103 of the PC 100 detects the abnormality of the inspection subject based on the time-correlation image data corresponding to the stripe pattern of the rectangular wave (A) and the time-correlation image data corresponding to the stripe pattern of the rectangular wave (B).

The PC 100 of the present embodiment receives the time-correlation image data corresponding to the stripe pattern of the rectangular wave (A) and the time-correlation image data corresponding to the stripe pattern of the rectangular wave (B). Thus, the shape of the surface of the inspection subject can be easily checked in addition to the abnormality based on the difference in phase and the abnormality based on the difference in amplitude as described in the first embodiment.

The present embodiment will be described by way of an example of superimposing a plurality of kinds of stripe widths on one stripe pattern. However, the method using a plurality of kinds of stripe widths is not limited to the superimposing method. As long as a plurality of stripe patterns having different stripe widths can be output for one inspection target surface, any method may be used. For example, control may be performed so as to switch a plurality of stripe patterns having different stripe widths to be alternately displayed.

Figure 20:
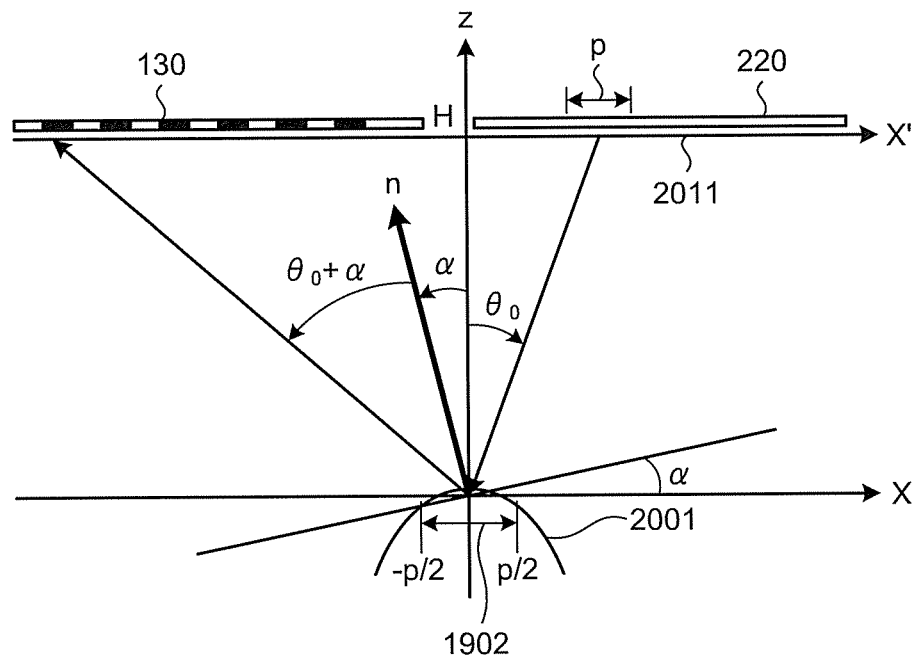
FIG. 20 is a diagram illustrating correspondence relationships among an image sensor, the screen, and a surface shape of an inspection subject in an inspection system of the second embodiment.

FIG. 20 is a diagram illustrating correspondence relationships among the image sensor 220, the screen 130, and a surface shape of the inspection subject in the inspection system of the present embodiment. In the example illustrated in FIG. 20, the stripe pattern emitted through the screen 130 moves in the x-direction, and light emitted from the screen 130 is reflected by a surface shape 2001 of the inspection subject to be received in the image sensor 220. A pixel 2011 of the image sensor 220 has a width p. In the example illustrated in FIG. 20, light, which is reflected by a center of a region 1902 between −p/2 and p/2 on the surface shape 2001 of the inspection subject, is received in the pixel 2011. The symbol x denotes a moving direction (direction in which the phase changes) of the spatially phase-modulated illumination (stripe pattern), and the symbol x' denotes a direction parallel to x at a distance H from x. The screen 130 and the image sensor 220 are located along x'. The z direction is orthogonal to the x-direction and the x'-direction. The symbol n denotes a normal vector. The symbol α denotes a gradient (angle) of a measurement target position in the x-direction, and also denotes the angle between the z-direction and the normal vector. The symbol $\theta_0$ denotes the angle formed by the z-direction and a line connecting the measurement target position to the center between −p/2 and p/2.

Herein, the surface shape of the inspection subject in the x-direction is defined as f(x). In this case, f(x) is expanded into a Taylor series, and as a result, can be represented by Expression (10) below. In Expression (10), $f_0$ denotes an initial position (offset) of the surface shape of the inspection subject, and R (=$1/f_{xx}$) denotes the curvature of the surface shape of the inspection subject. The symbol $f_{xx}$ denotes the second-order differential of f(x). For example, $f_x$ and $f_{xxx}$ can be omitted because only reflection from screen positions corresponding to amounts of shift needs to be considered.

$$f(x)=f_0+½f_{xx}x^2 \quad (10)$$

Figure 21:
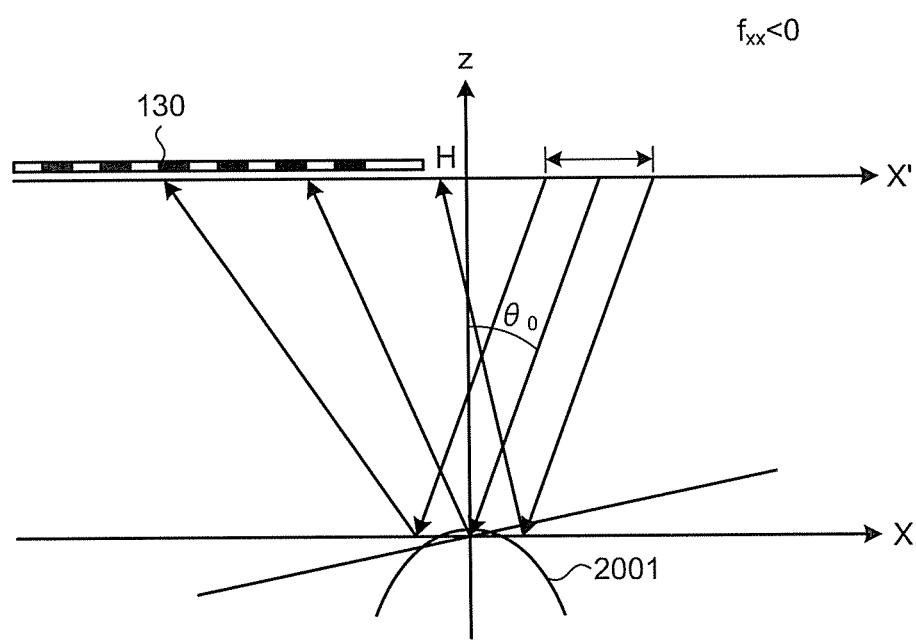
FIG. 21 is a diagram illustrating an example of the surface shape to be inspected on the inspection subject by the inspection system of the second embodiment, when the surface shape has a second-order differential $f_{xx}<0$.

The following describes the second-order differential $f_{xx}$. FIG. 21 is a diagram illustrating an example of the surface shape of the inspection subject when the second-order differential $f_{xx}$<0. As illustrated in FIG. 21, when the second-order differential $f_{xx}$<0, the surface shape 2001 of the inspection subject has a convex shape. In this case, the width of each pixel of the image sensor 220 increases on the screen 130 that emits the light received in the pixel.

Figure 22:
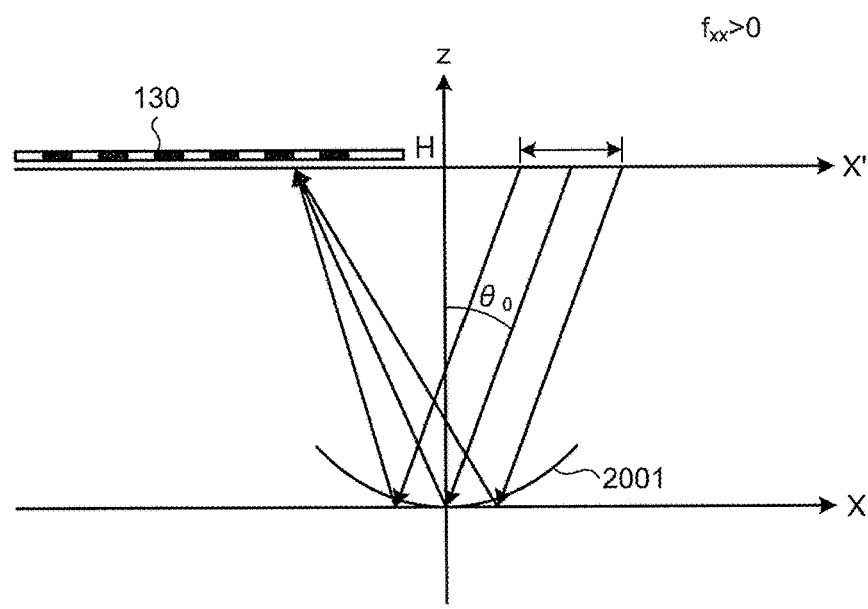
FIG. 22 is a diagram illustrating an example of the surface shape to be inspected on the inspection subject by the inspection system of the second embodiment, when $f_{xx}>0$.

FIG. 22 is a diagram illustrating an example of the surface shape of the inspection subject when $f_{xx}>0$. As illustrated in FIG. 22, when $f_{xx}>0$, the surface shape 2001 of the inspection subject has a concave shape. In this case, the width of each pixel of the image sensor 220 decreases on the screen 130 that emits the light received in the pixel. That is, it is found from FIGS. 21 and 22 that the surface shape of the inspection subject can be understood without viewing if the sign of the second-order differential $f_{xx}$ can be derived.

Referring back to FIG. 20, when α denotes the gradient of the surface shape at the center between $-p/2$ and $p/2$, a relationship represented by Expression (11) below is satisfied.

$$\tan \alpha = f_{xx} x \quad (11)$$

An angle of reflection of a line of sight can be calculated from Expression (12) below.

$$\tan(\theta_0 + 2\alpha) = \frac{\tan\theta_0 + \tan 2\alpha}{1 - \tan\theta_0 \tan 2\alpha} \quad (12)$$
$$= \frac{\gamma + \tan 2\alpha}{1 - \gamma \tan 2\alpha}$$
$$= \frac{\gamma(1 - \tan^2\alpha) + 2\tan\alpha}{(1 - \tan^2\alpha) - 2\gamma\tan\alpha}$$
$$= \frac{\gamma(1 - (f_{xx}x)^2) + 2f_{xx}x}{(1 - (f_{xx}x)^2) - 2\gamma f_{xx}x}$$
$$\approx \gamma + 2f_{xx}x + 2\gamma^2 f_{xx}x$$
$$= \gamma + 2(1 + \gamma^2) + f_{xx}x$$

The symbol γ represents $\tan \theta_0$. The argument $(\theta_0+2\alpha)$ included in the left-hand side of Expression (12) represents the angle of reflection with respect to the z-direction in the inspection target position that corresponds to the line of sight from the image sensor 220 directed to the inspection target position ($x=0$ in FIG. 20) on the surface shape 2001. The argument $(\theta_0+2\alpha)$ corresponds (i.e., is proportional) to the phase. The product $f_{xx}x$ included in the right-hand side of Expression (12) is equal to $\tan \alpha$ according to Expression (11). Hence, as is also clear from FIG. 20, Expression (12) indicates that the angle α characterizing the normal vector n corresponds to the phase of the spatially phase-modulated illumination (stripe pattern).

The coordinate x' on the screen 130 emitting light to the coordinate x of the surface shape of the inspection subject can be derived by Expression (13) below. The coordinate in the x-direction of the center between $-p/2$ and $p/2$ is denoted as $x_0$. The distance H is a distance from the center between $-p/2$ and $p/2$ to the surface on which the image sensor 220 and the screen 130 are arranged.

$$x' = x - H \tan(\theta_0 + 2\alpha) \quad (13)$$

A complex correlation pixel value g corresponding to the pixel 2011 is obtained by integrating the phase $e^{jkx'}$ of the light output through the screen 130 with the width p of the pixel 2011. That is, the complex correlation pixel value g can be derived from Expression (14). The wavenumber of the stripes is obtained as $k = 2\pi\lambda$, where λ denotes the width of the stripes.

$$g = \int_{-p/2}^{p/2} e^{jkx'} dx = \quad (14)$$
$$\int_{-p/2}^{p/2} e^{jk(-H(\gamma + 2(1+\gamma^2)f_{xx}x))} dx = p\,\mathrm{sinc}\left(\frac{\pi p}{\lambda}\omega\right)e^{-jkH\tan\theta_0}$$

Herein, a variable w is given by Expression (15) below.

$$w = 1 - 2H(1+\gamma^2)f_{xx} \quad (15)$$

In the inspection system of the present embodiment, when the illuminator 120 emits the stripe pattern obtained by superimposing a plurality of kinds of stripe widths, the time-correlation camera 110 separately generates the real part and the imaginary part of the two types of time-correlation image data corresponding to two kinds of stripe widths. The amplitude/phase image generator 104 of the PC 100 generates the amplitude image data and the phase image data from the received time-correlation image data for each stripe width.

Figure 23:
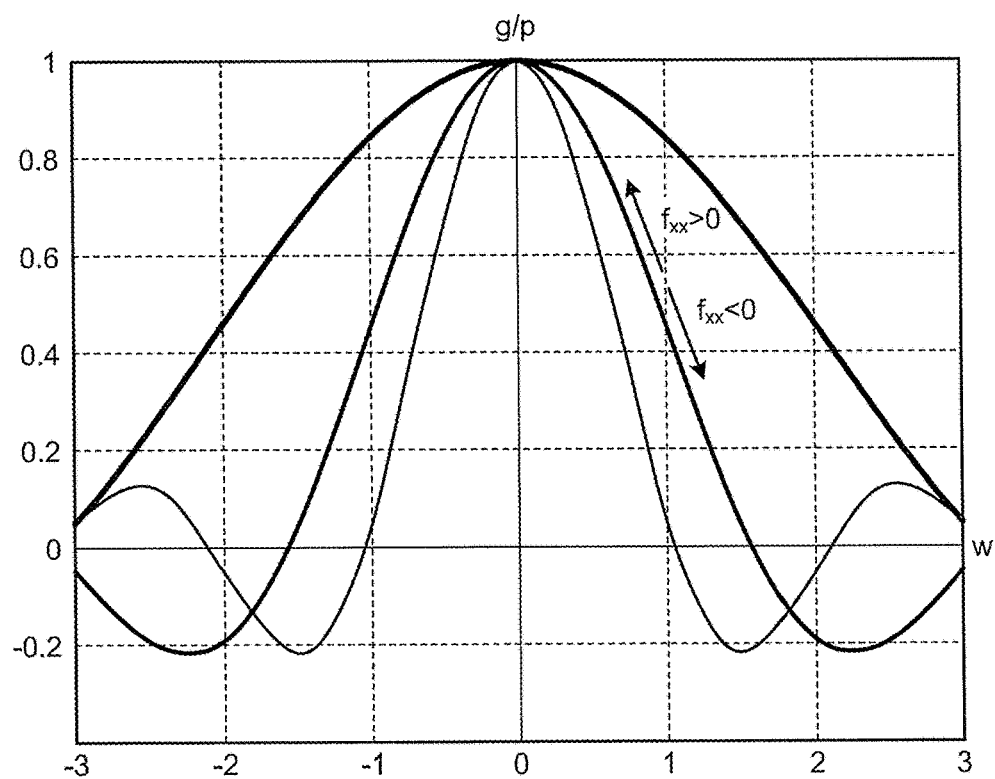
FIG. 23 is a graph indicating g/p when a stripe width of a stripe pattern is variously changed.

FIG. 23 is a graph indicating g/p when the stripe width of the stripe pattern is variously changed. In FIG. 23, the horizontal axis represents w, and the vertical axis represents g/p. Expression (15) indicates that g/p is divided into a case where $f_{xx}>0$ and a case where $f_{xx}<0$ at $w=1$. The variable has a value corresponding to the inspected position if there is no change in the distribution of normal vectors on the surface of the inspection subject 150 and in the positional relation of the inspection system (FIG. 20). Therefore, it is understandable from FIG. 23 that the value of the variable w, and consequently, the value of $f_{xx}$ can be estimated by obtaining a plurality of values of g/p as results of changing the width of the stripes, and by searching for the variable w agreeing with the ratios.

Specifically, Expression (16) below derived from Expression (14) is used, for example.

$$\alpha = \frac{\mathrm{sinc}\left(\frac{k_2 P}{2}W\right)}{\mathrm{sinc}\left(\frac{k_1 P}{2}W\right)} \quad (16)$$

A variable α corresponds to a ratio $g_2/g_1$ between a complex correlation pixel value (amplitude value) $g_1$ in the case of a larger stripe width and a complex correlation pixel value (amplitude value) $g_2$ in the case of a smaller stripe width, in Expression (14). Wavenumbers $k_1$ and $k_2$ have a relationship $k_1<k_2$.

Figure 24:
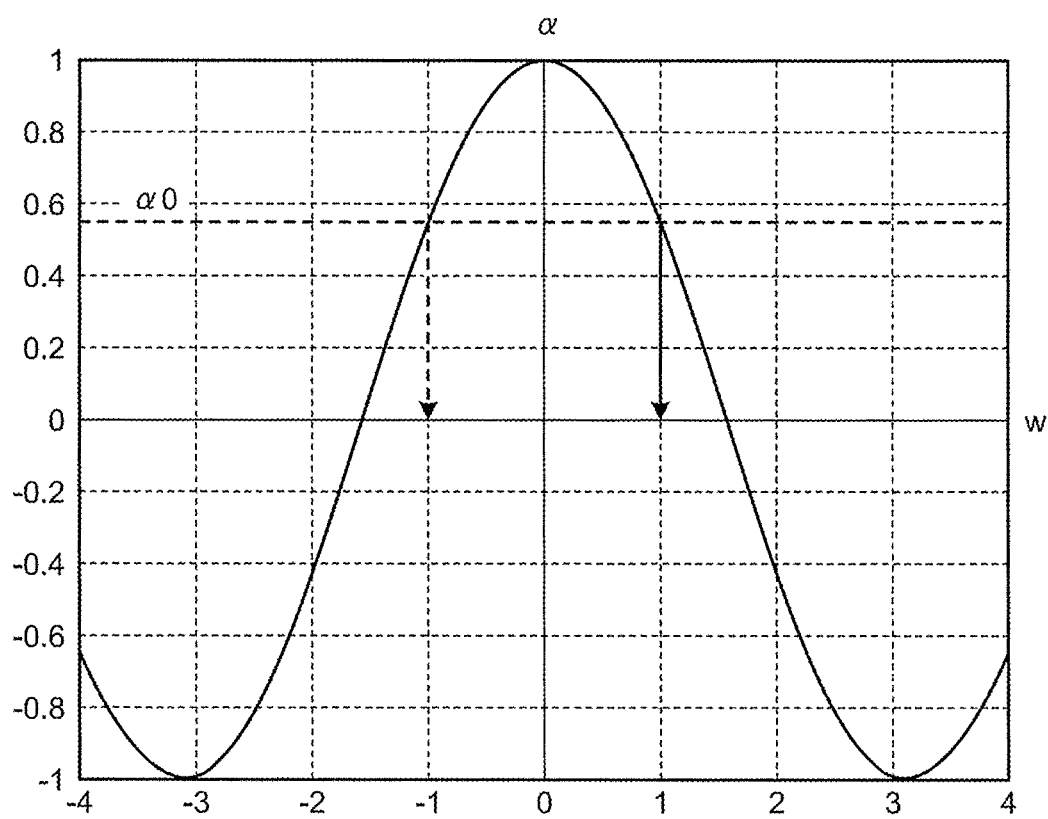
FIG. 24 is a diagram illustrating an example of an amplitude ratio correspondence table used by the inspection system of the second embodiment.

FIG. 24 is a diagram illustrating an example of an amplitude ratio correspondence table. The amplitude ratio correspondence table illustrated in FIG. 24 represents Expression (16). In FIG. 24, the horizontal axis represents w, and the vertical axis represents α. This amplitude ratio correspondence table is stored in advance in a storage (not illustrated) in the controller 103.

Herein, a value $\alpha_0$ represented by Expression (17) below based on a result of changing the stripe width is obtained for a particular inspected position (pixel).

$$\alpha_0 = \frac{\mathrm{sinc}\left(\frac{k_2 P}{2}W\right)}{\mathrm{sinc}\left(\frac{k_1 P}{2}W\right)} \quad (17)$$

The variables w satisfying that $\alpha=\alpha_0$ in Expression (16) can be obtained, as illustrated in FIG. 24. Under the condition that one of the two variables w can be selected, $f_{xx}$ can be derived from Expression (15) based on the selected variable w. Thereby, for example, it can be determined whether the defect (abnormality) present on the inspection subject 150 has a convex shape. In this manner, in the present embodiment, the stripe pattern having a plurality of kinds of stripe widths is used, so that the inspection accuracy of the inspection subject can be improved.

It is also found from FIG. 23 that, if w>0 in each sinc function, a reduction from the maximum value of g/p, that is, the canceling out between amplitudes can be easily detected as long as the variable w is in a range larger than the variable w at which g/p first reaches zero (w at which an abscissa intercept is first reached). From the condition that the sinc function reaches zero, a relationship that $(\pi \cdot p \cdot w/\lambda) > \pi$ should be satisfied in Expression (14), and the stripe width (that is, period length in the phase change direction of the spatially phase-modulated illumination) should be set so as to satisfy Expression (18) below.

$$p \cdot w/\lambda > 1 \quad (18)$$

It is also considered from FIG. 23 that detectability based on the difference in g/p can be actually ensured even if the variable w is substantially a half the above-mentioned value, so that the stripe width (that is, period length in the phase change direction of the spatially phase-modulated illumination) may be set so as to satisfy Expression (19) below.

$$p \cdot w/\lambda > 0.5 \quad (19)$$

<Third Embodiment>

The first and the second embodiments have been described by way of the examples in which the inspection subject is irradiated with the stripe pattern having dark and bright parts at regular intervals. However, the above-described embodiments are not limited to emitting the stripe pattern of regular intervals. Thus, a third embodiment will be described by way of an example of changing the intervals of the stripe pattern in accordance with the shape of the inspection subject.

The inspection system does not limit the shape of the inspection subject to be inspected and thus various shapes can be considered as the surface shape of the inspection subject. The PC 100 in the inspection system of the present embodiment controls, when capturing the inspection subject, the arm 140 to set the position of the inspection subject so as to appropriately inspect the surface of the inspection subject. At that time, the PC 100 transfers a stripe pattern suitable for the surface of the inspection subject to the illuminator 120.

Figure 25:
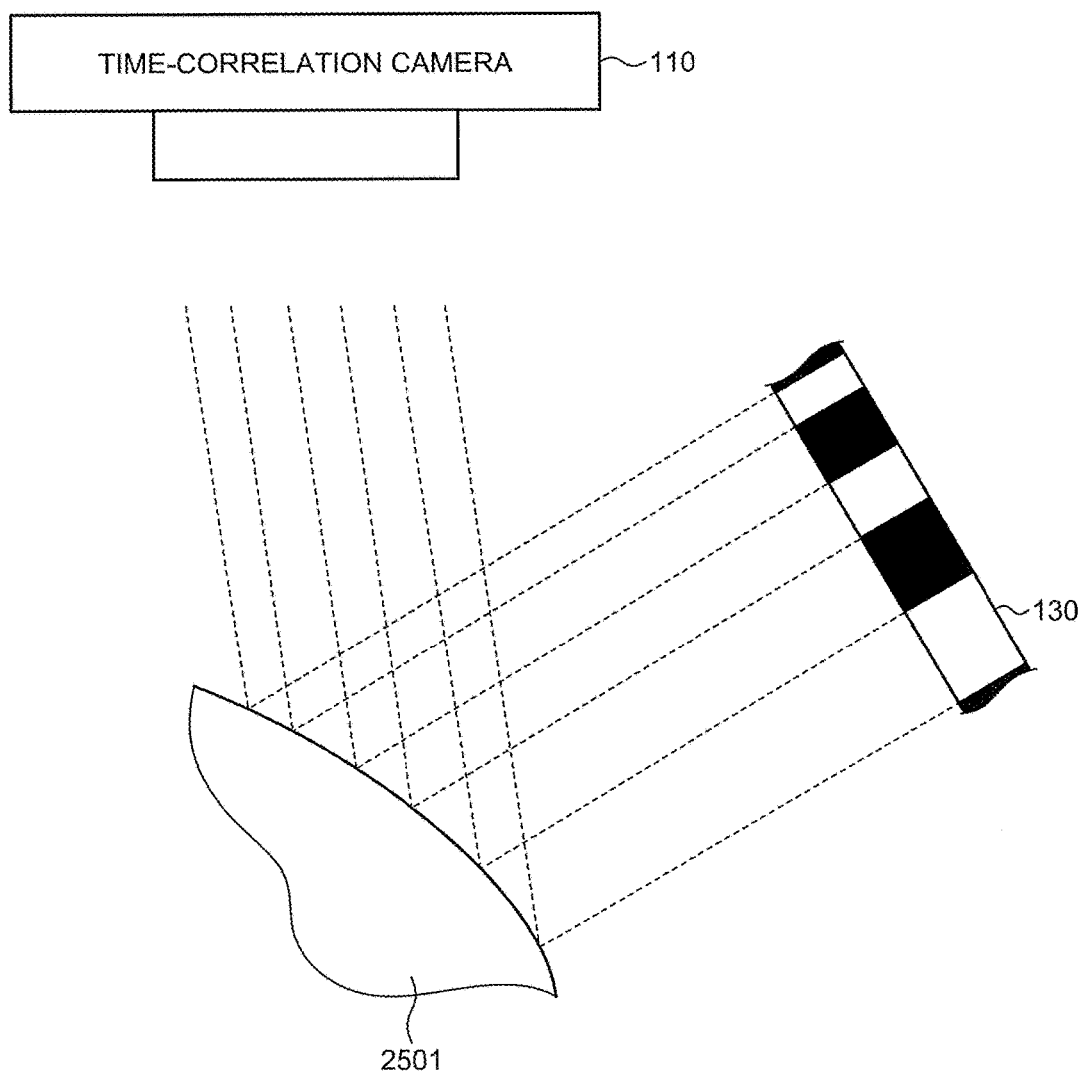
FIG. 25 is a diagram illustrating an example in which a stripe pattern in accordance with a surface shape of an inspection subject is emitted from the screen by an inspection system according to a third embodiment.

FIG. 25 is a diagram illustrating an example in which a stripe pattern in accordance with a surface shape of an inspection subject 2501 is emitted from the screen 130. In the example illustrated in FIG. 25, for the inspection system to detect abnormalities of the inspection subject 2501, the stripe pattern entering the time-correlation camera 110 preferably has regular intervals. For this reason, the illuminator 120 emits the stripe pattern to the screen 130 so that the stripe pattern after being reflected by the inspection subject 2501 has regular intervals, as illustrated in the example depicted in FIG. 25.

The storage of the PC 100 stores therein in advance a stripe pattern (to have regular intervals after being reflected) corresponding to each surface to be captured on the inspection subject 2501. The stripe pattern is a stripe pattern that is set according to the inclination of a surface of the inspection subject 2501 to be inspected. For example, the stripe pattern is a stripe pattern that has substantially regular stripe widths when being received in the time-correlation camera 110 after being reflected by that surface.

Each time the arm 140 changes the surface to be captured on the inspection subject 2501, the PC 100 outputs the stripe pattern set according to the inclination of the surface to the illuminator 120. The illuminator 120 starts emitting the received stripe pattern. Thereby, it is possible to emit the stripe pattern suitable for the surface shape of the inspection subject 2501.

Figure 26:
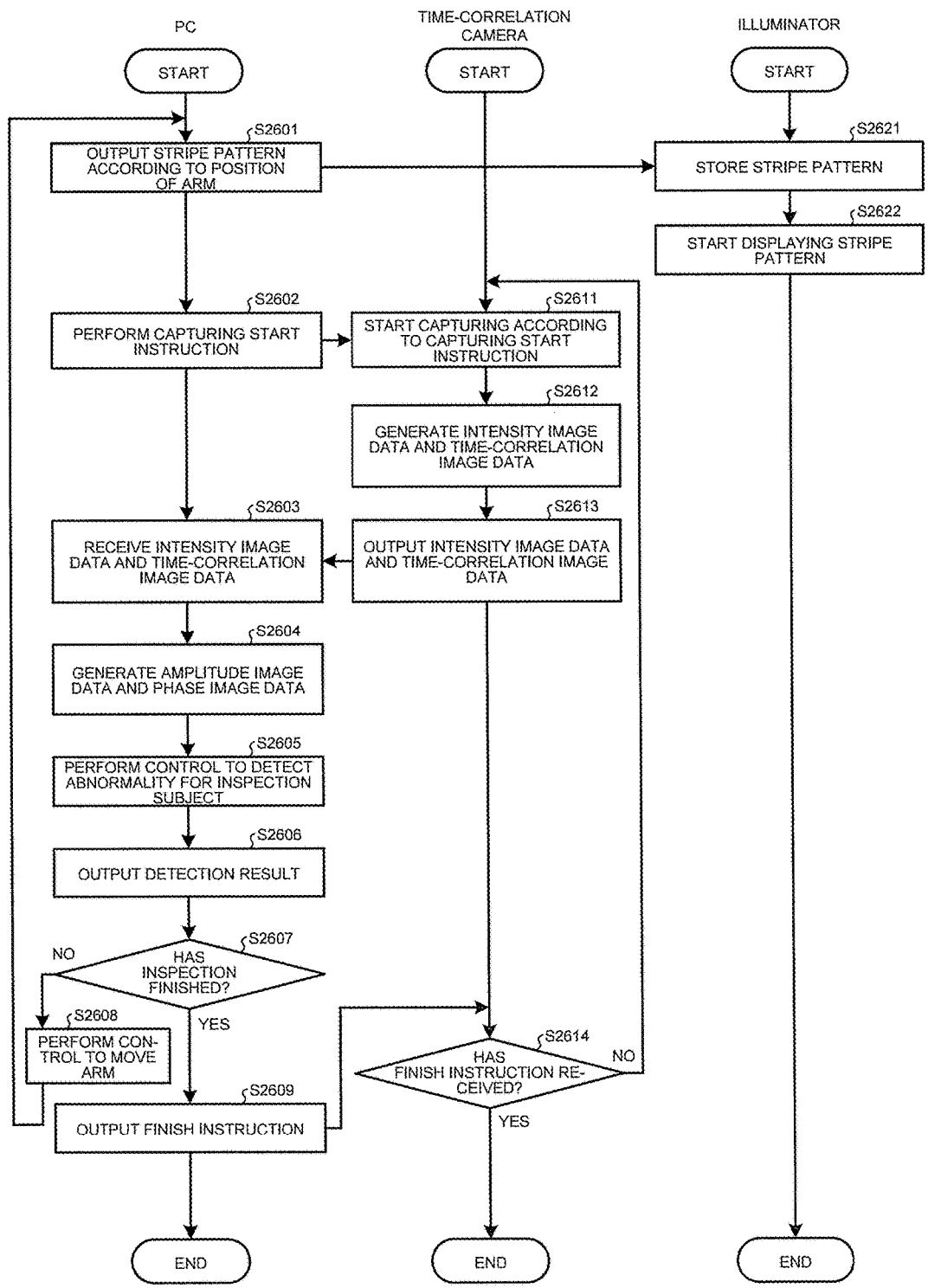
FIG. 26 is a flowchart illustrating a procedure of inspection processing for the inspection subject by the inspection system of the third embodiment.

The following describes the inspection processing of the inspection subject in the inspection system of the present embodiment. FIG. 26 is a flowchart illustrating a procedure of the above-described processing by the inspection system of the present embodiment. The inspection subject 2501 is already fixed to the arm 140, and placed in the initial position of the inspection.

The PC 100 of the present embodiment outputs, to the illuminator 120, a stripe pattern according to the position of the arm 140 (Step S2601). That is, in the present embodiment, a stripe pattern corresponding to the position of the arm 140 serves as the stripe pattern suitable for the surface shape to be captured on the inspection subject fixed to the arm 140.

The illuminator 120 stores the stripe pattern received from the PC 100 (Step S2621). The illuminator 120 displays the stripe pattern corresponding to the initial position to be inspected so as to vary with time transition (Step S2622).

Then, the process from the capturing to the output of the detection result of abnormalities of the inspection subject is performed (Steps S2602 to S2606 and Steps S2611 to S2613) in the same manner as the process at Steps S1402 to S1406 and Steps S1411 to S1413 illustrated in FIG. 14.

Then, the controller 103 determines whether the inspection of the inspection subject has finished (Step S2607). If not (No at Step S2607), the aim controller 101 performs control to move the arm 140 according to a predetermined setting so that the time-correlation camera 110 can capture a surface of an inspection subject to be inspected next (Step S2608).

After the control to move the arm 140 at Step 2608 has finished, the controller 103 outputs again a stripe pattern according to the position of the arm 140 to the illuminator 120 (Step S2601). Thereby, the stripe pattern to be output can be switched each time the surface to be captured is switched.

If the inspection of the inspection subject is determined to have finished (Yes at Step S2607), the controller 103 outputs the finish instruction to the time-correlation camera 110 (Step S2609), and the process is then ended.

The time-correlation camera 110 determines whether the finish instruction is received (Step S2614). If not (No at Step S2614), the time-correlation camera 110 performs the process again from Step S2611. If the finish instruction is received (Yes at Step S2614), the process is then ended.

The processing performed by the illuminator 120 may be ended by the inspector, or may be ended according to an instruction from another component.

<Fourth Embodiment>

The embodiments and the modifications have been described by way of the examples in each of which the illuminator 120 displays a linear stripe pattern. However, the embodiments are not limited to cases in which the illuminator 120 displays the linear stripe pattern. The illuminator 120 may display stripe patterns of other forms. Thus, a fourth embodiment will be described by way of an example of displaying a stripe pattern different from those of the above-described embodiments.

Figure 27:
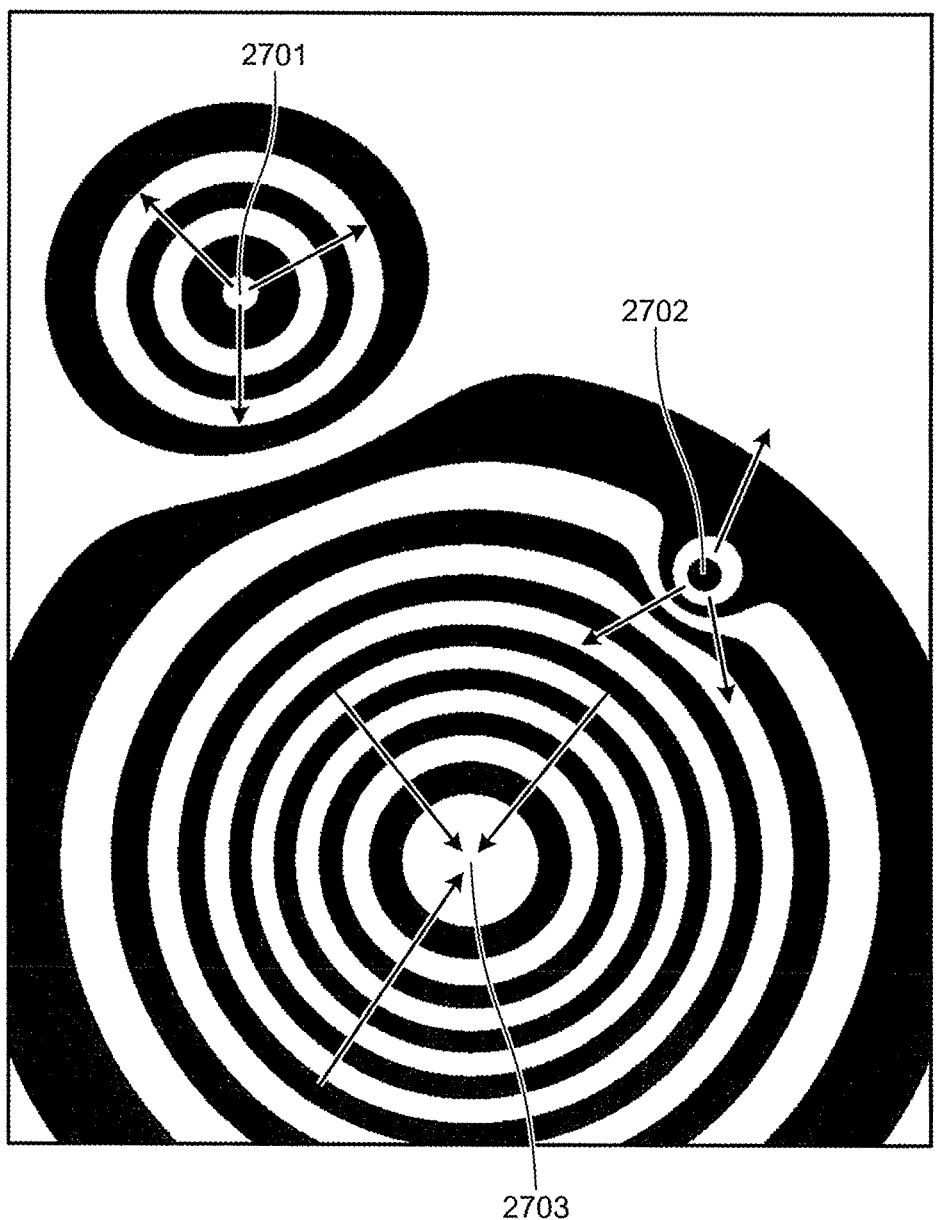
FIG. 27 is a diagram illustrating an example of a stripe pattern displayed on the screen by the illuminator according to a fourth embodiment.

FIG. 27 is a diagram illustrating an example of a stripe pattern displayed on the screen 130 by the illuminator 120 of the present embodiment. The stripe pattern illustrated in FIG. 27 is displayed so that stripe patterns generated at generation points 2701 and 2702 (source points) converge to a convergence point 2703 (sink point). As illustrated in FIG. 27, if the intensity of light varies at predetermined intervals, abnormalities (defects) of the inspection subject can be detected. The following describes a method for generating the stripe pattern.

Figure 28:
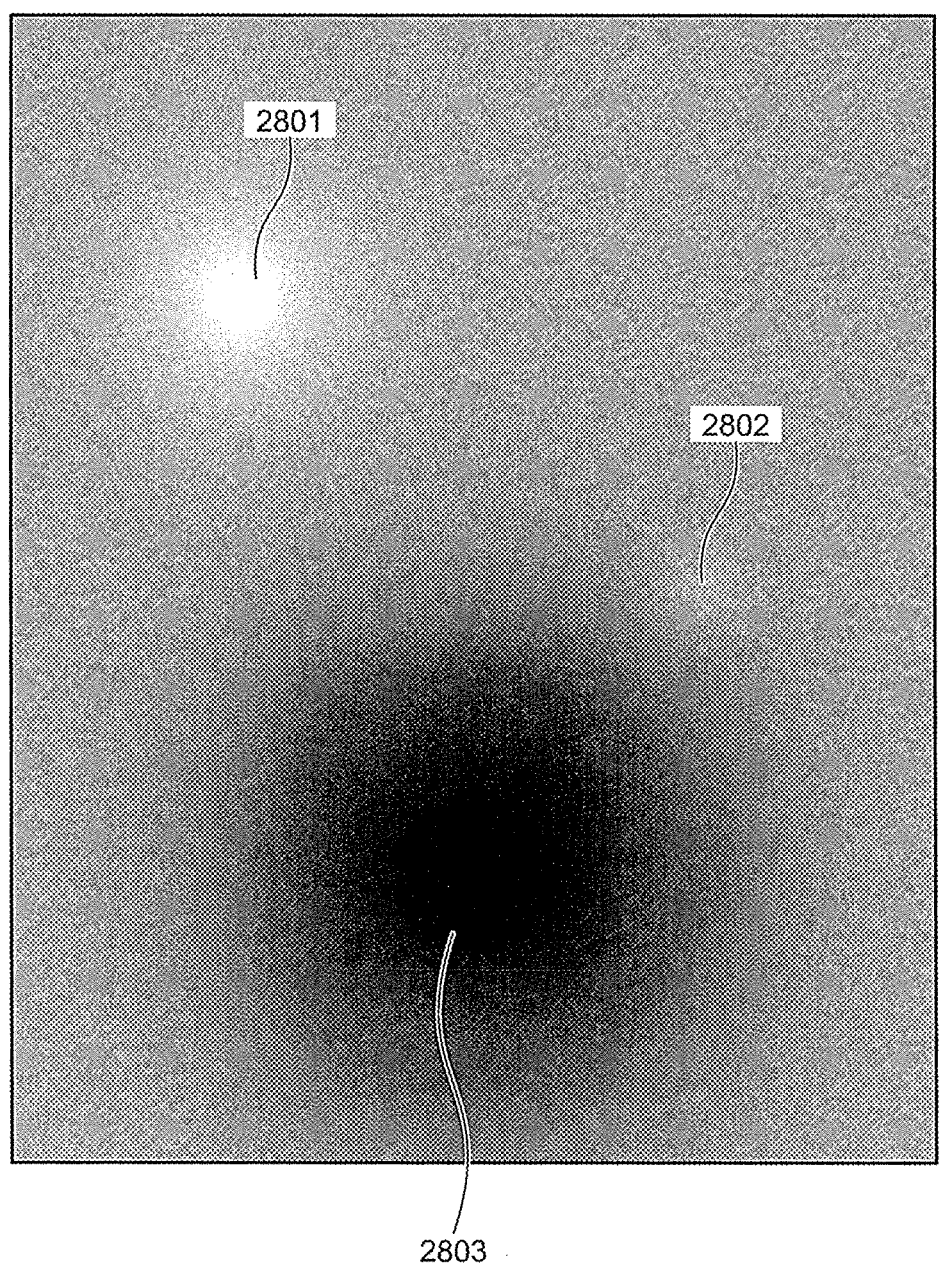
FIG. 28 is a diagram illustrating an example representing, using brightness (density), an initial phase distribution (spatial phase distribution) on the surface of the inspection subject or the screen to generate the stripe pattern of FIG. 27.

FIG. 28 is a diagram illustrating an example representing, using brightness (density), an initial phase distribution $\phi_0(x,y)$ (spatial phase distribution) on the surface of the inspection subject 150 or the screen 130 for generating the stripe pattern of FIG. 27. A white point (bright point) has a value of $\pi$, and a black point (dark point) has a value of $-\pi$. In FIG. 28, for example, the point 2701 is given a value of $\pi$; the point 2702 is given a value of $\pi/2$; and the point 2703 (bottom point) is given an initial value of $-\pi$; then, using these points as constraint conditions and assuming each of the points as a top point or the bottom point, the initial phase distribution $\phi_0(x,y)$ is set so as to yield, for example, bell-shaped distributions according to the distances from the points.

The stripe pattern of FIG. 27 is generated based on the phase distribution $\phi_0(x,y)$ of FIG. 28. The number of stripes between the top point and the bottom point can be adjusted with the wavenumber k. In this example, the wavenumber k is the number of stripes between the top point and the bottom point. By taking the wavenumber k into account, the phase distribution $\phi(x,y)$ is given as $\phi(x,y)=k\cdot\phi_0(x,y)$. To form black-and-white stripes, the distribution should be binarized according to the value of $\phi(x,y)$. Specifically, regions where the phase $\phi(x,y)$ is from $-\pi$ to 0 should be set to be dark regions, and regions where the phase $\phi(x,y)$ is from 0 to $\pi$ should be set to be bright regions, for example. As a result, a stationary stripe pattern such as that illustrated in FIG. 27 is obtained. The stationary stripe pattern can be represented as $R[e^{j\phi(x,y)}]$, where $R[\ ]$ represents calculation to take a real part of a complex number. Through multiplication by a modulation term $e^{j\omega t}$, a moving stripe pattern can be represented as $R[e^{j\omega t}\cdot e^{j\phi(x,y)}]$. In this manner, the moving stripe pattern can be generated based on $e^{j\omega t}\cdot e^{j\phi(x,y)}$. The phase distribution $\phi(x,y)$ and the stripe pattern exemplified herein are merely examples. Any stripe pattern can be obtained by appropriately setting the initial phase distribution according to the shape of the inspection subject 150. The wavenumber k is set to an appropriate value according to the size of defects to be detected.

In the example illustrated in FIG. 28, arbitrary points on the surface of the inspection subject have been set as points 2801 and 2802 having high light intensities and a point 2803 having a low light intensity. However, when the phase distribution is generated, points having high light intensities and points having low light intensities can be considered to be set according to the surface shape of the inspection subject.

Figure 29:
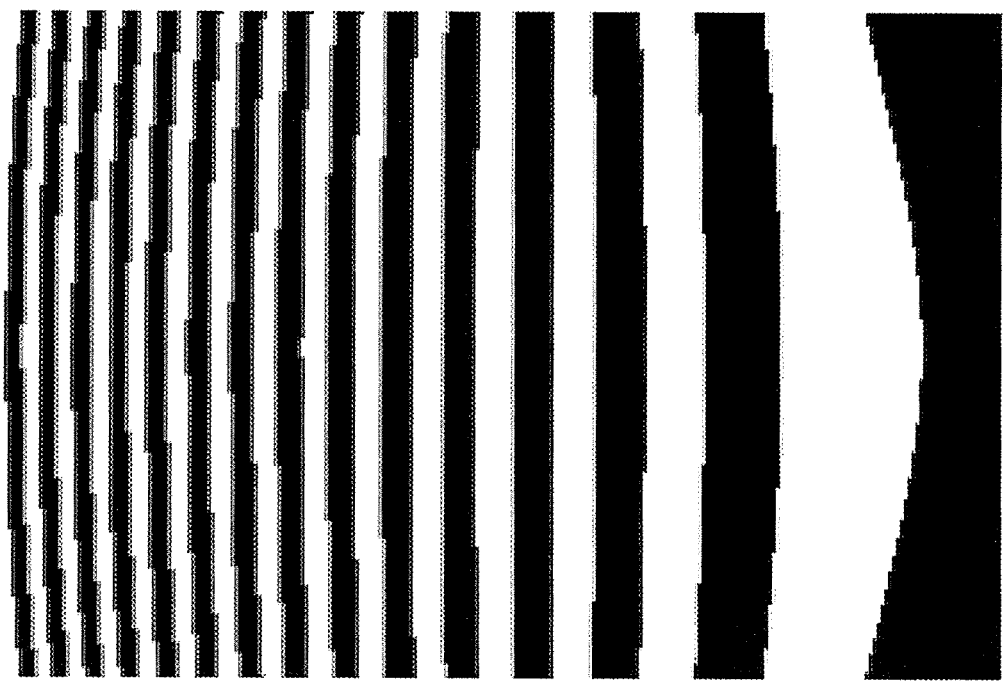
FIG. 29 is a diagram illustrating an example of a stripe pattern that is projected on a spherical inspection subject, and that is viewed as moving parallel stripes along a line of sight from the time-correlation camera as illustrated in FIG. 25.

FIG. 29 is a diagram illustrating an example of a stripe pattern that is projected on the spherical inspection subject 150, and that is viewed as moving parallel stripes along a line of sight from the time-correlation camera 110 as illustrated in FIG. 25. In the example of FIG. 29, the inclination (gradient) becomes larger leftward in the right-left direction, and becomes larger upward and downward from the center in the up-down direction. According to the present embodiment, a stripe pattern likely to obtain a more appropriate inspection result can be obtained by setting the phase distribution $\phi(x,y)$ according to the shape of the inspection subject 150. The phase distribution $\phi(x,y)$ can also be set based on computer-aided design (CAD) data. The stripe pattern on the illuminator, such as the screen 130, can be calculated: by setting the stripe pattern on the surface of the inspection subject 150 based on the phase distribution $\phi(x,y)$ obtained in view of the three-dimensional shape of the inspection subject 150; and by applying coordinate transformation to the stripe pattern on the surface, for example.

The inspection program to be executed by the PC 100 of any of the embodiments described above is provided by being recorded as a file in an installable or executable format on a computer-readable recording medium, such as a compact disc read-only memory (CD-ROM), a flexible disk (FD), a compact disc recordable (CD-R), or a digital versatile disc (DVD).

The inspection program to be executed by the PC 100 of any of the embodiments described above may be stored on a computer connected to a network, such as the Internet, and provided by being downloaded through the network. The inspection program to be executed by the PC 100 of any of the embodiments described above may be provided or distributed through a network, such as the Internet.

While the several embodiments of the present invention have been described, these embodiments have been provided as examples, and are not intended to limit the scope of the invention. These novel embodiments can be carried out in various other forms, and can be variously omitted, replaced, or modified within the scope not departing from the gist of the invention. The embodiments and the modifications thereof are included in the scope and the gist of the invention, and also included in the scope of the invention described in the claims and equivalents thereof.

The invention claimed is:

1. An inspection system comprising:
a planar illuminator that temporally varies an intensity of light emitted from the planar illuminator to an inspection target surface in a successive and periodic manner by spatially moving a stripe pattern of the intensity of the light; and
at least one processor configured to:
multiply a light intensity signal by a reference signal, the light intensity signal representing an intensity of light reflected from the inspection target surface in response to the light emitted from the planar illuminator incident on the inspection target surface, the reference signal periodically changing in response to a temporal change of the intensity of the light emitted from the planar illuminator due to spatially moving the strip pattern of the intensity of the light emitted from the planar illuminator according to a lapse of time;
generate, using an image capturing device, a time-correlation image according to the multiplied light intensity signal; and
calculate a characteristic from the time-correlation image, the characteristic corresponding to a concave-convex irregularity/abnormality of the inspection target surface and serving to detect an abnormality based on at least either a difference from a surrounding area or a difference from a reference surface,
wherein the planar illuminator temporally varies the intensity of the light emitted from the planar illuminator in the successive and periodic manner in a single exposure time of the image capturing device by spatially moving the stripe pattern of the intensity of the light emitted from the planar illuminator according to the lapse of time.

2. The inspection system according to claim 1, wherein the stripe pattern is set so as to be projectable based on the following expression (1):

$$e^{j\omega t} \cdot e^{j\phi(x,y)} \quad (1)$$

where e represents an exponential function, j represents an imaginary number, ω represents a temporal angular velocity, t represents time, x and y represent two-dimensional coordinates, and φ represents a phase distribution continuously varying in the x-y plane.

3. The inspection system according to claim 1, wherein a stripe width of the stripe pattern is set so as to satisfy the following expression (2):

$$p \cdot w / \lambda > 0.5 \quad (2)$$

where $w = 1 - 2H(1+\gamma^2) \cdot f_{xx}$, p represents a width of an image capturing element of the time-correlation camera, λ represents the stripe width, H represents a distance between an inspection subject and the planar illumination unit, γ represents $\tan \theta_0$, $\theta_0$ represents an angle of a direction of the image pickup device with respect to a frontal direction of the inspection subject, $f_{xx}$, represents the second-order derivative of f(x), f(x) is a function representing a shape of a surface, and x represents a direction along a representative surface of the inspection subject.

4. The inspection system according to claim 1, wherein the stripe pattern is set so as to move in a direction intersecting a longitudinal direction of a defect.

5. The inspection system according to claim 1, wherein a stripe width of the stripe pattern is set according to an inclination of the inspection target surface.

6. The inspection system according to claim 1, wherein the illumination unit outputs a plurality of stripe patterns having different stripe widths to one inspection target surface.

7. The inspection system according to claim 1, wherein the illumination unit outputs a stripe pattern including a plurality of stripes having different stripe widths.

8. The inspection system according to claim 7, wherein the stripe pattern includes a plurality of stripes having different stripe widths and extending in the same direction.

9. The inspection system according to claim 7, wherein the stripe pattern includes a plurality of stripes having different widths and extending in intersecting directions.

10. The inspection system according to claim 1, wherein the illumination unit outputs a plurality of stripe patterns extending in different directions to one inspection target surface.

11. An inspection method comprising:
varying an intensity of light emitted from a planar illuminator to an inspection subject in a successive and periodic manner by spatially moving a stripe pattern of the intensity of light;
multiplying a light intensity signal by a reference signal, the light intensity signal representing an intensity of light reflected from the inspection target surface of an inspection subject in response to the light emitted from the planar illuminator incident on the inspection target surface, the reference signal periodically changing in response to a temporal change of the intensity of the light emitted from the planar illuminator due to spatially moving the strip pattern of the intensity of the light emitted from the planar illuminator according to a lapse of time;
generating, using an image capturing device, a time-correlation image for the inspection subject irradiated with the light emitted from the planar illuminator according to the multiplied light intensity signal; and
calculating a characteristic from the time-correlation image, the characteristic corresponding to a concave-convex irregularity/abnormality of the inspection target surface and serving to detect an abnormality based on at least either a difference from a surrounding area or a difference from a reference surface,
wherein the intensity of the light emitted from the planar illuminator is varied in the successive and periodic manner in a single exposure time of the image capturing device by spatially moving the stripe pattern of the intensity of the light emitted from the planar illuminator according to the lapse of time.

12. An inspection system comprising:
a planar illuminator that temporally varies an intensity of light emitted from the planar illuminator to an inspection target surface in a successive and periodic manner by spatially moving a stripe pattern of the intensity of the light; and
at least one processor configured to:
multiply a light intensity signal by a reference signal, the light intensity signal representing an intensity of light reflected from the inspection target surface in response to the light emitted from the planar illuminator incident on the inspection target surface, the reference signal periodically changing in response to a temporal change of the intensity of the light emitted from the planar illuminator due to spatially moving the strip pattern of the intensity of the light emitted from the planar illuminator according to a lapse of time; and
generate a time-correlation image according to the multiplied light intensity signal, the time correlation image being used for calculating a characteristic from the time-correlation image, the characteristic corresponding to a concave-convex irregularity/abnormality of the inspection target surface and serving to detect an abnormality based on at least either a difference from a surrounding area or a difference from a reference surface,
wherein the planar illuminator temporally varies the intensity of the light emitted from the planar illuminator in the successive and periodic manner in a single exposure time for generating the time-correlation image by spatially moving the stripe pattern of the intensity of the light emitted from the planar illuminator according to the lapse of time.

* * * * *

UNITED STATES PATENT AND TRADEMARK OFFICE
CERTIFICATE OF CORRECTION

PATENT NO. : 10,724,960 B2
APPLICATION NO. : 15/129273
DATED : July 28, 2020
INVENTOR(S) : Toru Kurihara et al.

Page 1 of 1

It is certified that error appears in the above-identified patent and that said Letters Patent is hereby corrected as shown below:

On the Title Page

Under item "(73) Assignee", please change the city of Residence of the third Assignee, KOCHI PREFECTURAL PUBLIC UNIVERSITY CORPORATION "Koichi" to --Kochi--.

Signed and Sealed this
First Day of December, 2020

Andrei Iancu
*Director of the United States Patent and Trademark Office*